United States Patent
Kapik et al.

(10) Patent No.: US 10,225,575 B2
(45) Date of Patent: Mar. 5, 2019

(54) IMAGE RECONSTRUCTION IN WHICH UNKNOWN PATCH IS REPLACED BY SELECTED PATCH

(71) Applicant: NEC Corporation, Minato-ku, Tokyo (JP)

(72) Inventors: Lee Kapik, Tokyo (JP); Atsushi Sato, Tokyo (JP); Takashi Shibata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/506,009

(22) PCT Filed: Sep. 3, 2014

(86) PCT No.: PCT/JP2014/004511
§ 371 (c)(1),
(2) Date: Feb. 23, 2017

(87) PCT Pub. No.: WO2016/035107
PCT Pub. Date: Mar. 10, 2016

(65) Prior Publication Data
US 2017/0280158 A1  Sep. 28, 2017

(51) Int. Cl.
*H04N 19/59* (2014.01)
*H04N 5/21* (2006.01)
(Continued)

(52) U.S. Cl.
CPC ........... *H04N 19/59* (2014.11); *G06T 3/4053* (2013.01); *H04N 5/21* (2013.01); *H04N 7/0125* (2013.01);
(Continued)

(58) Field of Classification Search
USPC ..... 345/582; 375/240.02; 382/155, 195, 299
See application file for complete search history.

(56) References Cited

U.S. PATENT DOCUMENTS 6,496,184 B1 12/2002 Freeman et al.
8,538,200 B2 * 9/2013 Wang .................... G06T 3/4053
345/582
(Continued)

FOREIGN PATENT DOCUMENTS

WO  2011/021605 A1  2/2011
WO  2013/089261 A1  6/2013
WO  2013/089265 A1  6/2013

OTHER PUBLICATIONS

Takashi Shibata, Akihiro Iketani, and Shuji Senda, "Super Resolution Reconstruction Composed of Perturbed Examplar", The IEICE Transaction on Information and Systems (Japanese Edition), vol. J96-D, No. 8, The Institute of Electronics, Information and Communication Engineers, Aug. 1, 2013, p. 1790-1800.
(Continued)

*Primary Examiner* — Xuemei G Chen

(57) ABSTRACT

An image processing device according to one of the exemplary aspects of the present invention includes: inferring means for selecting, for each of local unknown patches including a target unknown patch, candidate patches from a plurality of input patches based on similarity to the local unknown patch, the local unknown patches being images generated from a part of an unknown image, the plurality of input patches being images generated from a plurality of input images, a subject ID (Identifier) being correlated with the input patches that are generated from an input image to which the subject ID is assigned in the plurality of input image; first score calculation means for calculating a score representing nearness of a candidate patch in the candidate patches to a local unknown patch in the local unknown patches; and patch replacement means for calculating a score summation for the subject ID by summing up scores of the candidate patches being correlated with a same subject ID in the candidate patches of the local unknown
(Continued)

patches, and selecting, as a selected patch being used for reconstruction of a reconstruction image, a candidate patch that is correlated with the subject ID for which the score summation is highest from the candidate patches selected for the target unknown patch.

10 Claims, 16 Drawing Sheets

(51) Int. Cl.
H04N 7/01 (2006.01)
G06T 3/40 (2006.01)
H04N 19/14 (2014.01)
H04N 19/172 (2014.01)
H04N 19/54 (2014.01)

(52) U.S. Cl.
CPC ......... H04N 19/14 (2014.11); H04N 19/172 (2014.11); H04N 19/54 (2014.11)

(56) References Cited

U.S. PATENT DOCUMENTS

| | | | | |
|---|---|---|---|---|
| 8,565,518 B2* | 10/2013 | Kameyama | ........... | G06T 3/4053 382/155 |
| 8,750,603 B2* | 6/2014 | Bethge | ........... | H04N 19/176 375/240.02 |
| 8,798,373 B2* | 8/2014 | Shibata | ........... | G06T 5/005 382/195 |
| 9,117,262 B2* | 8/2015 | Lin | ........... | G06T 5/002 |
| 9,299,002 B2* | 3/2016 | Cherigui | ........... | H04N 19/147 |
| 9,317,904 B2* | 4/2016 | Shibata | ........... | G06T 5/003 |
| 9,317,905 B2* | 4/2016 | Shibata | ........... | G06T 5/003 |
| 9,378,541 B2* | 6/2016 | Kim | ........... | G06T 5/002 |
| 9,436,981 B2* | 9/2016 | Shibata | ........... | G06N 99/005 |
| 9,679,370 B2* | 6/2017 | Shibata | ........... | G06T 5/50 |
| 2013/0259390 A1* | 10/2013 | Dunlop | ........... | G06K 9/00718 382/224 |
| 2014/0093185 A1* | 4/2014 | Liang | ........... | G06T 3/4053 382/299 |
| 2014/0334720 A1* | 11/2014 | Shibata | ........... | G06T 5/003 382/159 |
| 2015/0117762 A1* | 4/2015 | Shibata | ........... | H04N 19/97 382/159 |
| 2015/0302273 A1* | 10/2015 | Senda | ........... | G06T 3/4053 382/155 |
| 2015/0302566 A1* | 10/2015 | Shibata | ........... | G06T 5/001 382/159 |
| 2016/0055627 A1* | 2/2016 | Shibata | ........... | H04N 1/3871 382/254 |
| 2016/0098852 A1* | 4/2016 | Senda | ........... | H04N 5/247 382/195 |
| 2016/0189357 A1* | 6/2016 | Shibata | ........... | G06K 9/6857 382/197 |

OTHER PUBLICATIONS

International Search Report for PCT Application No. PCT/JP2014/004511, dated Oct. 28, 2014.
Written opinion of the International Search Authority for PCT Application No. PCT/JP2014/004511.

* cited by examiner

Fig. 8
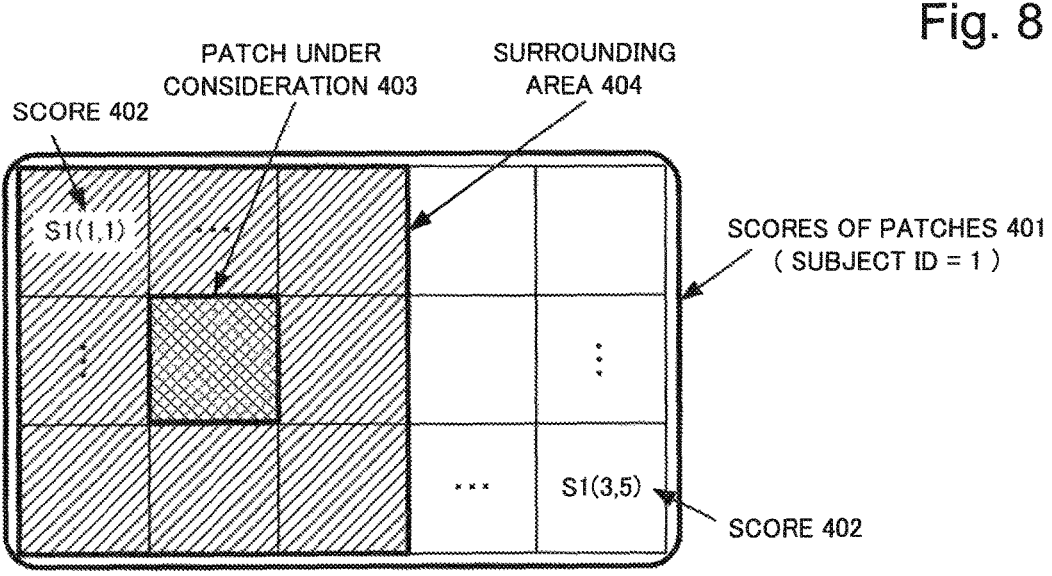
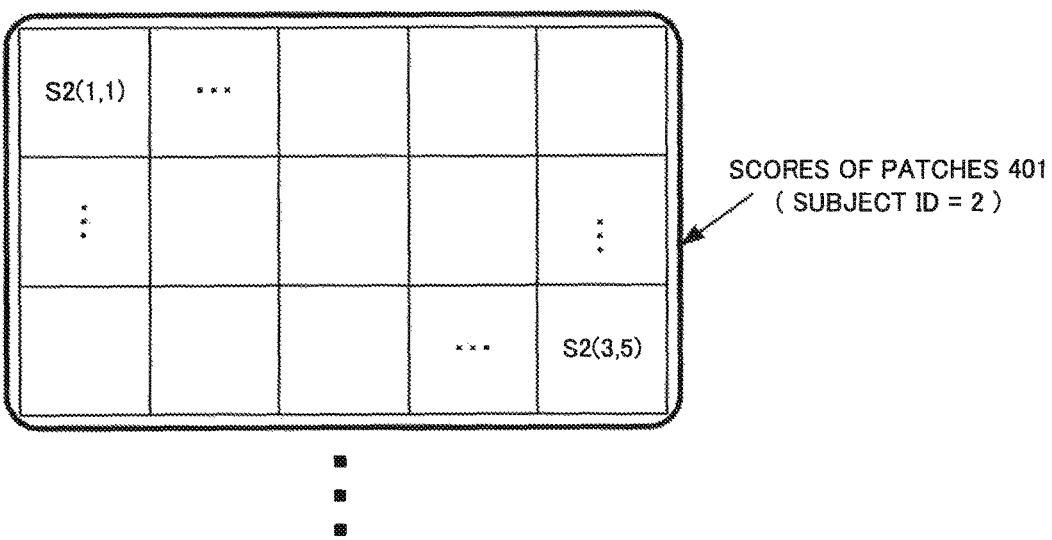
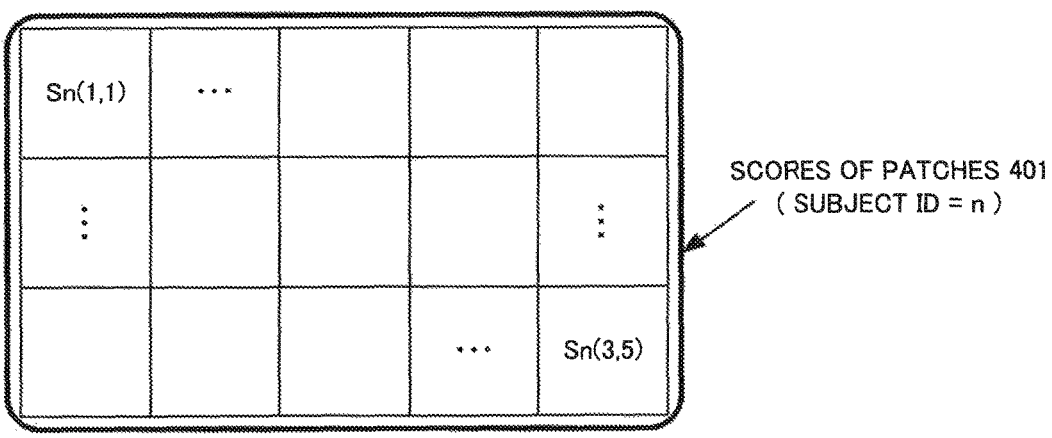

ically, it is related to an image processing
IMAGE RECONSTRUCTION IN WHICH UNKNOWN PATCH IS REPLACED BY SELECTED PATCH This application is a National Stage Entry of PCT/JP2014/004511 filed on Sep. 3, 2014, which also claims its priority, the contents of all of which is incorporated herein by reference, in its entirety.

TECHNICAL FIELD

The present invention is related to an image processing technology of restoring degraded images.

BACKGROUND ART

Super resolution is one of the methods to restore degraded images. Exemplar based super-resolution reconstructs higher resolution images from input low resolution images by using pre-specified high-resolution-and-low-resolution image pairs in training set.

An example of exemplar-based super-resolution method is disclosed in PTL 1. As shown in FIG. 1 of PTL 1, the method disclosed in PTL 1 mainly consists of training stage and inferring stage.

As illustrated in FIG. 1 of PTL 1, in the training phase, scenes (high resolution; HR) and images (low resolution) are acquired by synthesis or measurement. The acquired high resolution and low resolution images are then partitioned into overlapping pieces called "patches" as shown in FIG. 2 of PTL 1. Each low-resolution patch is linked to the corresponding high resolution patch as pairs in the training stage.

In the inferring phase, an unknown image is also partitioned into patches. For each patch of the unknown image, the training data is searched to find a collection of candidates which best explains the unknown patch. Selection of patch is determined by choosing the training patch which has the highest score (e.g. smallest L2 norm i.e. the nearest neighbour) among the collection of candidate patches. The inferred scene is then reconstructed by combining these chosen training patches.

Another example of exemplar-based super resolution method is disclosed in PTL 2. PTL 2 also discloses an image processing device which also includes training phase and inferring phase. The training phase also includes a dictionary storing data and the associated blurred patches. The inferring phase in PTL 2 calculates a weighed degree-of-similarity between input patches and blurred patches in the dictionary. The weight is calculated by using degree of doubt (K) which depends on similarity of the selected HR to candidate HR patches in the dictionary. The inferred scene is reconstructed by combining patches which have lowest degree of doubt (K).

PTL 3 discloses an object recognition method which mainly includes three phases: choosing the most similar object from database, score calculation and sorting of similar objects from database. The score calculation includes similarity score which calculates the similarity between query feature vector and database feature vectors. ID (Identifier) numbers are assigned to objects in database so that each type of objects has one ID. Similarity score is calculated by sum of scores between query and database objects of the same ID.

CITATION LIST

Patent Literature

[PTL 1]
U.S. Pat. No. 6,496,184

[PTL 2]
PCT International Application Publication No. WO 2013/089261
[PTL 3]
PCT International Application Publication No. WO 2011/021605

SUMMARY OF INVENTION

Technical Problem

High resolution images reconstructed by the method disclosed by PTL 1 are usually not suitable for face recognition with surveillance camera, as the reconstructed images are usually not sharp, and lack genuine details of the original subject.

In the method disclosed by PTL 1, at each location, only the information of one patch (usually the nearest neighbour patch) is used in the inferring phase. There can be more than one scene patch which explain the observed patch well in the database, and they are usually from different subjects, so using information of only one patch at each location will usually result in patches chosen from a lot of different subjects.

As the selected patches come from different subjects, during the combination of the selected overlapping patches to form a high resolution image, some details on the selected patches will be averaged out, making the high resolution image not sharp.

Moreover, getting patches from too many different subjects also makes the resulting high resolution image lack genuine details of the original subject.

The method according to PTL 2 tries to solve the above-described problem by weighing candidate patches by degree of doubt (K). However the degree of doubt (K) only measures the similarity between candidate patches at the same location. Candidate patches in surrounding locations are not considered. The problem of selecting patches from many different subjects and hence averaging out details of images during overlapping is not solved.

The method according to PTL 3 calculates similarity score by summing up the scores between the query and objects of the same ID (same type) in the dictionary. Instead of considering image patches, the whole query image is considered in the score calculation. The method according to PTL 3 does not help to select similar patches in order to restore the degraded images.

The methods in PTL 1 and PTL 2 do not produce sharp images enough for face recognition with surveillance camera, while method in PTL 3 considers the object image as a whole in calculation of similarity score, method in PTL 3 is not able to select similar patches for reconstruction of degraded images.

The present invention aims to solve the above-described problem in the method such that sharp high resolution image can be reconstructed and the reconstructed image is similar to an original of an unknown input image.

Solution to Problem

An image processing device according to one of the exemplary aspects of the present invention includes: inferring means for selecting, for each of local unknown patches including a target unknown patch, candidate patches from a plurality of input patches based on similarity to the local unknown patch, the local unknown patches being images generated from a part of an unknown image, the plurality of input patches being images generated from a plurality of input images, a subject ID (Identifier) being correlated with the input patches that are generated from a input image to which the subject ID is assigned in the plurality of input image; first score calculation means for calculating a score representing nearness of a candidate patch in the candidate patches to a local unknown patch in the local unknown patches; and patch replacement means for calculating a score summation for the subject ID by summing up scores of the candidate patches being correlated with a same subject ID in the candidate patches of the local unknown patches, and selecting, as a selected patch being used for reconstruction of a reconstruction image, a candidate patch that is correlated with the subject ID for which the score summation is highest from the candidate patches selected for the target unknown patch.

An image processing method according to one of the exemplary aspects of the present invention includes: selecting, for each of local unknown patches including a target unknown patch, candidate patches from a plurality of input patches based on similarity to the local unknown patch, the local unknown patches being images generated from a part of an unknown image, the plurality of input patches being images generated from a plurality of input images, a subject ID (Identifier) being correlated with the input patches that are generated from a input image to which the subject ID is assigned in the plurality of input image; calculating a score representing nearness of a candidate patch in the candidate patches to a local unknown patch in the local unknown patches; and calculating a score summation for the subject ID by summing up scores of the candidate patches being correlated with a same subject ID in the candidate patches of the local unknown patches, and selecting, as a selected patch being used for reconstruction of a reconstruction image, a candidate patch that is correlated with the subject ID for which the score summation is highest from the candidate patches selected for the target unknown patch.

A computer readable storage medium according to one of the exemplary aspects of the present invention stores a program causing a computer to operate as: inferring means for selecting, for each of local unknown patches including a target unknown patch, candidate patches from a plurality of input patches based on similarity to the local unknown patch, the local unknown patches being images generated from a part of an unknown image, the plurality of input patches being images generated from a plurality of input images, a subject ID (Identifier) being correlated with the input patches that are generated from a input image to which the subject ID is assigned in the plurality of input image; first score calculation means for calculating a score representing nearness of a candidate patch in the candidate patches to a local unknown patch in the local unknown patches; and patch replacement means for calculating a score summation for the subject ID by summing up scores of the candidate patches being correlated with a same subject ID in the candidate patches of the local unknown patches, and selecting, as a selected patch being used for reconstruction of a reconstruction image, a candidate patch that is correlated with the subject ID for which the score summation is highest from the candidate patches selected for the target unknown patch. The program stored in above-described computer readable storage medium also realizes one of the exemplary aspects of the present invention.

Advantageous Effects of Invention

According to the exemplary aspects of the present invention, it is possible to reconstruct a sharp high resolution image which is similar to the original of the unknown input image.

BRIEF DESCRIPTION OF DRAWINGS

FIG. 8 is a diagram illustrating an example of a surrounding area around the patch under consideration.

DESCRIPTION OF EMBODIMENTS

First Exemplary Embodiment

A first exemplary embodiment of the present invention will be explained in details with reference to drawings.

Figure 2:
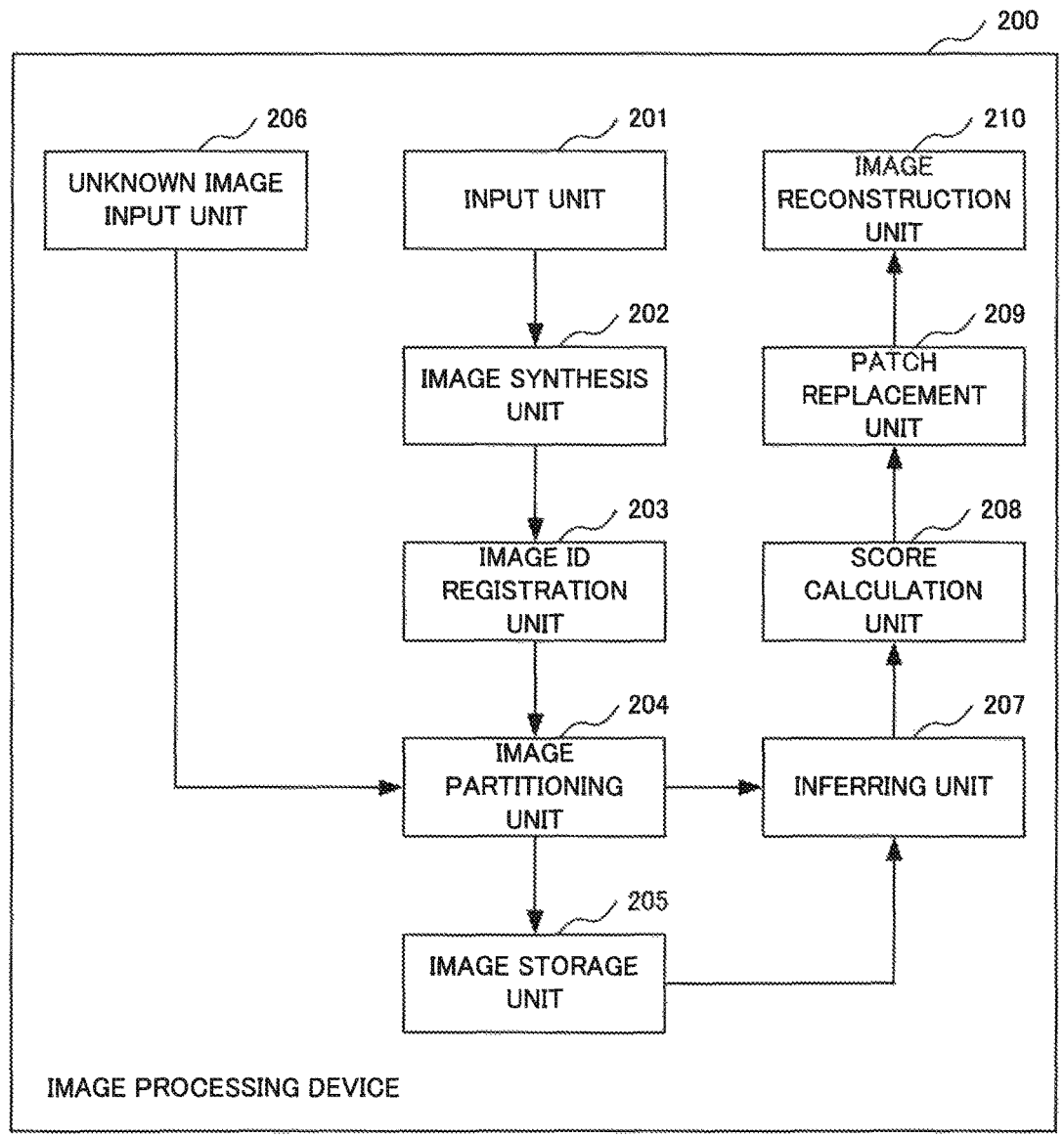
FIG. 2 is a block diagram showing a structure of an image processing device 200 according to a first exemplary embodiment of the present invention.

FIG. 2 is a block diagram showing a structure of an image processing device 200 according to the first exemplary embodiment of the present invention.

The image processing device 200 includes an input unit 201, an image synthesis unit 202, an image ID registration unit 203, an image partitioning unit 204, an image storage unit 205, an unknown image input unit 206, an inferring unit 207, a score calculation unit 208, a patch replacement unit 209 and an image reconstruction unit 210. The inferring unit 207 is also described as the first score calculation unit 207 in the description of the exemplary embodiments of the present invention.

The input unit 201 receives high resolution input face images, which is described simply as "input face images" or "input images" in the following. The high resolution input face images may be, for example, images obtained by photographing faces to make a face database or a face dictionary.

The image synthesis unit 202 normalizes the face images which are received by the input unit 201. That is, the image synthesis unit 202 transforms each of the input face images so that predetermined kinds of feature points, for example, on face parts, such as eyes, nose and mouth, and the like, of all input face images are at their respective same or almost same position in the face images. The image synthesis unit 202 may detect the face parts and the predetermined feature points on the face parts from the face images. Various face recognition method may be used as the method of detecting the face parts and the predetermined feature points on the face parts for the image synthesis unit 202. Various methods of transforming a face image may be used as the method of transforming the input face images by the image synthesis unit 202. The input face image normalized by the image synthesis unit 202 is described as "the normalized face image", "the normalized image" or "the normalized input image" in the following. The image synthesis unit 202 may not normalize the input images when, for example, the input images are already normalized.

The image ID registration unit 203 assigns IDs to the input face images according to identities of the input face images respectively, and registers the IDs, each of which is also described as "subject ID" in the following. The identities of the input face images may be identities of persons whose faces are imaged in the face images, respectively. Each of the IDs may be a unique data value.

The image partitioning unit 204 generates overlapping patches from the input images. Specifically, the image partitioning unit 204 partitions each of the normalized face images into the overlapping patches. Each of the overlapping patches is an image that is a part of one of the normalized face images. The overlapping patches may overlap among them, that is, two or more of the overlapping patches may have a common part. The overlapping patches are described simply as "the patches", "the input patches" or "dictionary patches" in the following. Size of the patches can be decided arbitrarily or by experiment and may be decided in advance. The size of each of the patches may be the same. The image partitioning unit 204, for each of the patches, correlates the patch with the ID of the input face image that is normalized into the normalized face image which is partitioned into the patch. The image partitioning unit 204 stores the IDs and the patches in the image storage unit 205.

The image storage unit 205 stores the IDs of the input face images and the patches partitioned from the input face images.

The unknown image input unit 206 receives a low resolution unknown face image, whose identity is not given to the image processing device 200. The resolution of the low resolution unknown face image may be lower than resolution of input face images. The low resolution unknown face image is described as the "unknown face image," the "input query image" or "the unknown image" in the following. The low resolution unknown face image may be a face image extracted from, for example, a surveillance image obtained by a camera included in a crime prevention system.

The image partitioning unit 204 generates overlapping patches from the unknown face image. Specifically, in the same way as partitioning the input face images, the image partitioning unit 204 also partitions the unknown face image into the overlapping patches. The overlapping patches generated from the unknown face image are described as "the low resolution unknown face image patches", "the unknown face image patches" or "the unknown patches" in the following. Each of the unknown face image patches is an image that is a part of the unknown face image. Size of the unknown face image patches may be the same as the size of the dictionary patches.

The inferring unit 207 selects, among patches stored in the image storage unit 205, a set of candidate patches which best explain each of the low resolution unknown face image patches. The inferring unit 207 may estimate, for example, a degree of similarity between each of the unknown face image patches and each of the patches stored in the image storage unit 205 by one of various methods to estimate similarity between two images. The inferring unit 207 may estimate similarity by comparing L2 norm distance described below. The inferring unit 207 may select patches among the patches stored in the image storage unit 205 as the candidate patches on the basis of the result of estimating the similarity. The patch most similar to the concerning unknown face image patch is described as the "nearest neighbour patch" of the concerning unknown face image patch. In other words, the inferring unit 207 may infer the nearest neighbour patch by determining the most similar patch for each of the concerning unknown face image patch as the nearest neighbour patch. The inferring unit 207 may infer the nearest neighbour patch and select the nearest neighbour patch as the selected patch for each of the unknown image face patch.

The score calculation unit 208 calculates scores of the candidate patches selected by the inferring unit 207.

The patch replacement unit 209 selects the patch with the highest score calculated by the score calculation unit 208 for each of the unknown face image patches. The patch replacement unit 209 may replace the selected patch that is the nearest neighbour patch inferred by the inferring unit 207 by the patch with the highest score calculated by the score calculation unit 208.

The image reconstruction unit 210 combines the selected patches, each of which is the nearest neighbour patch which are not replaced by the patch replacement unit 209 or the replaced patch with the highest score, to reconstruct a high resolution image.

Figure 3:
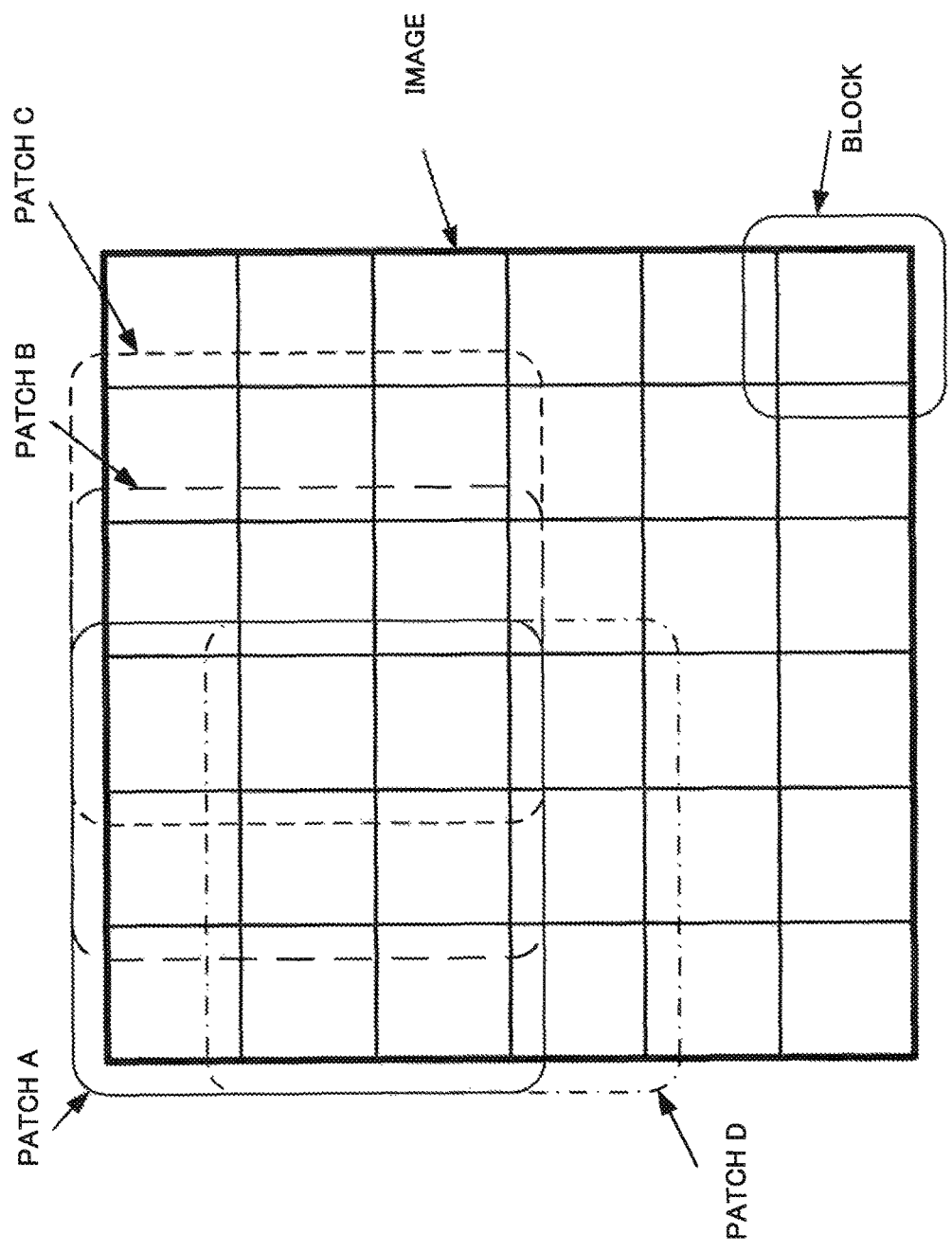
FIG. 3 is a diagram showing an example of overlapping patches partitioned by the image partitioning unit 204.

FIG. 3 is a diagram showing an example of overlapping patches partitioned by the image partitioning unit 204. Blocks shown in FIG. 3 are areas each including one or more pixels on a partitioned image, such as the input image or the unknown image. Patches, such as Patch A, Patch B, Patch C and Patch D shown in FIG. 3, are examples of overlapping patches generated by partitioning the image. The patches may overlap with one or more of the other patches.

Next, an operation of the image processing device 200 is described in detail with reference to drawings.

Figure 4:
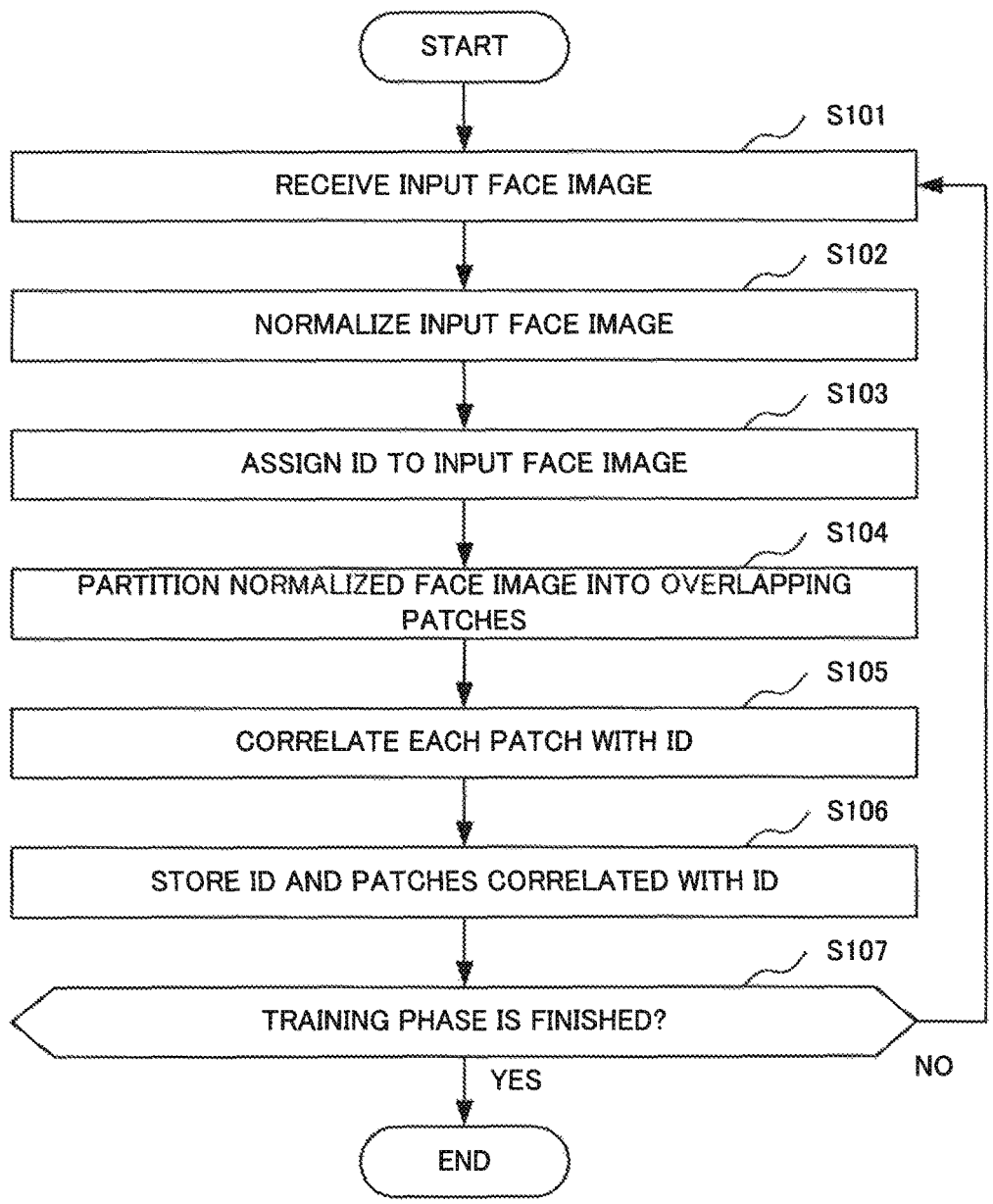
FIG. 4 is a flow chart showing an example of operation of the image processing device 200 according to the first and a second exemplary embodiments of the present invention in a training phase.

FIG. 4 is a flow chart showing an example of operation of the image processing device 200 in a training phase.

Figure 5:
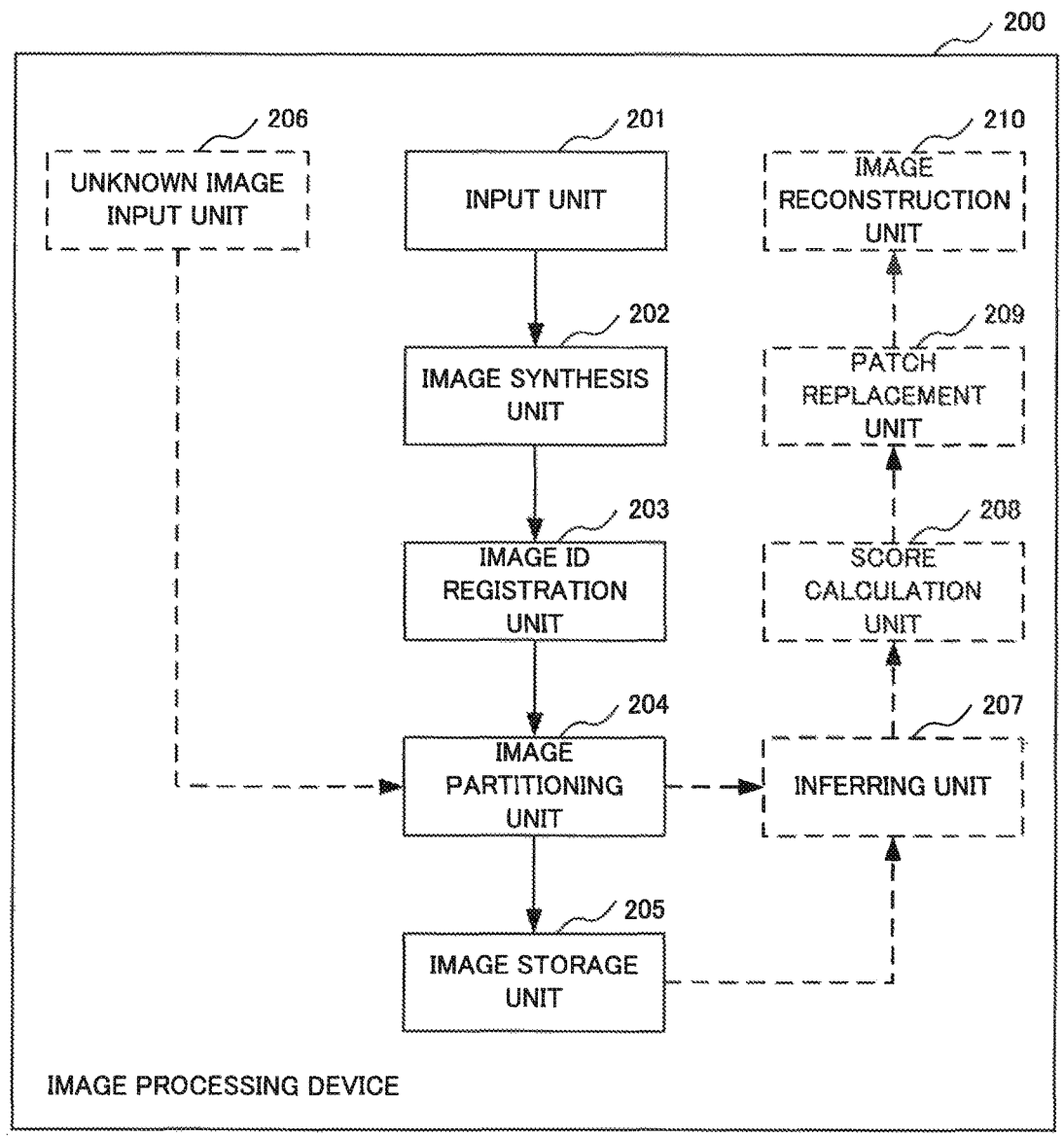
FIG. 5 is a block diagram showing the image processing device 200 according to the first exemplary embodiment of the present invention in the training phase.

FIG. 5 is a block diagram showing the image processing device 200 in the training phase. In the training phase, units which operate in the image processing device 200 are such as the input unit 201, the image synthesis unit 202, the image ID registration unit 203, the image partitioning unit 204 and the image storage unit 205. In FIG. 5, other units are drawn by broken lines.

According to FIG. 4, the input unit 201 receives an input face image (Step S101). The input face image may be input by a server (not illustrated) storing high resolution face images. The input unit 201 may read out the input face image from a storage device (not illustrated) storing high resolution face images. The input unit 201 may also receive an identity of the input face image in Step S101.

Next, the image synthesis unit 202 normalizes the input face image (Step S102). The image ID registration unit 203 assigns an ID to the input face image (Step S103).

The image partitioning unit 204 partitions the normalized face image, which is the input image normalized by the image synthesis unit 202, into the overlapping patches (Step S104). In Step S104, the image partitioning unit 204 may extract a partial image at a different location in the normalized input image as each of the patches. The image partitioning unit 204 may determine, according to, for example, a predetermined rule, the locations of the patches in the normalized input face image so that the normalized input face image is covered by the patches. The overlapping patch may partially overlap one or more of the other overlapping patches.

The image partitioning unit 204 correlates each of the patches with the ID (Step S105). The image partitioning unit 204 stores, in the image storage unit 205, the ID and the patches correlated with the ID (Step S106). A user of the image processing device 200 may instruct to finish the training phase via a terminal device (not illustrated) which is communicably connected with the image processing device 200. The image processing device 200 may determine whether the training phase is finished by a condition of finishing the training phase. When the training phase is finished (Yes in Step S107), the operation illustrated in FIG. 4 is finished. When the training phase is not finished (No in Step S107), the image processing device 200 performs the operations from Step S101 to Step S106 once more.

Figure 6:
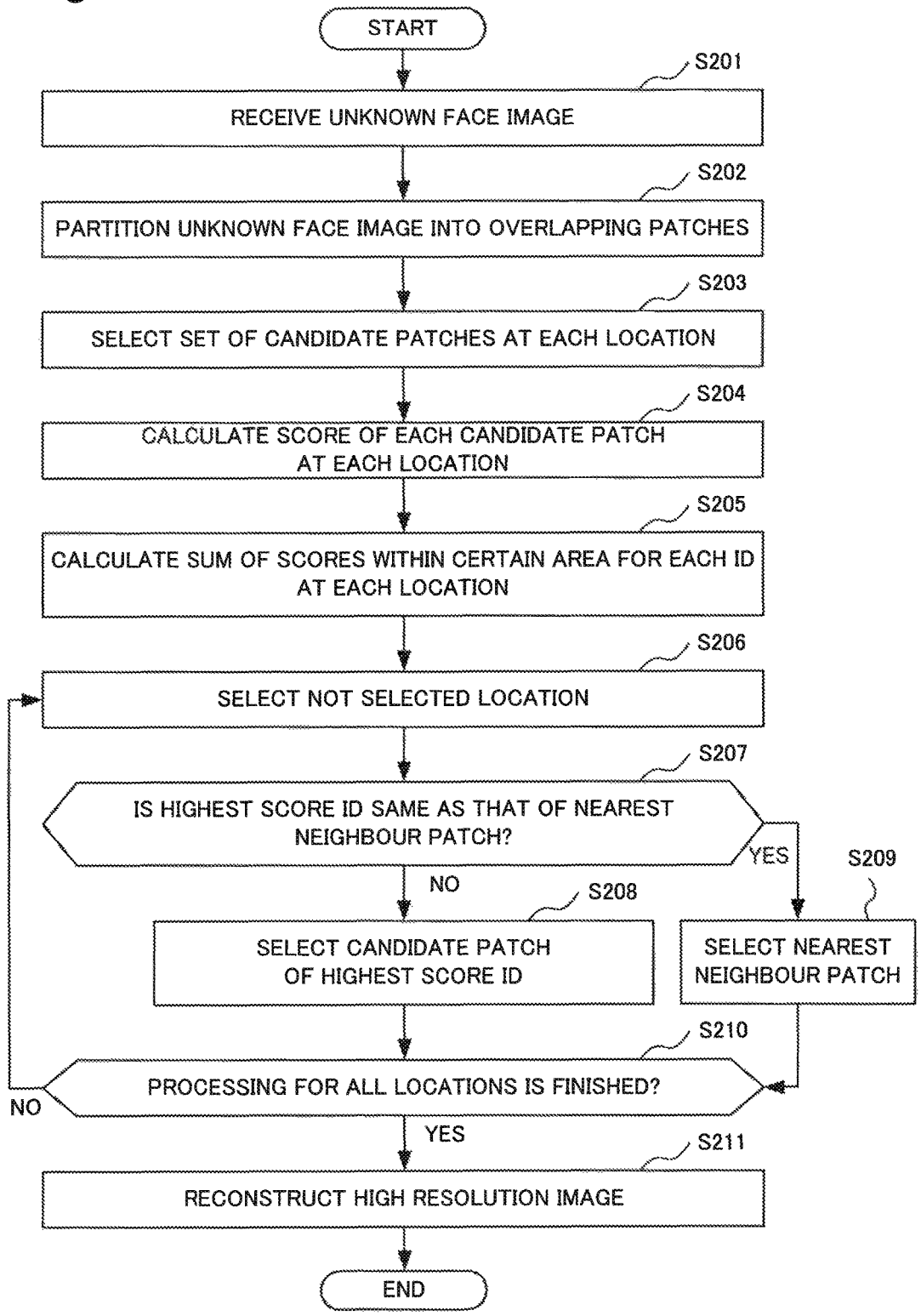
FIG. 6 is a flow chart showing operation of the image processing device 200 according to the first exemplary embodiment of the present invention in a reconstruction phase.

FIG. 6 is a flow chart showing operation of the image processing device 200 in a reconstruction phase.

Figure 7:
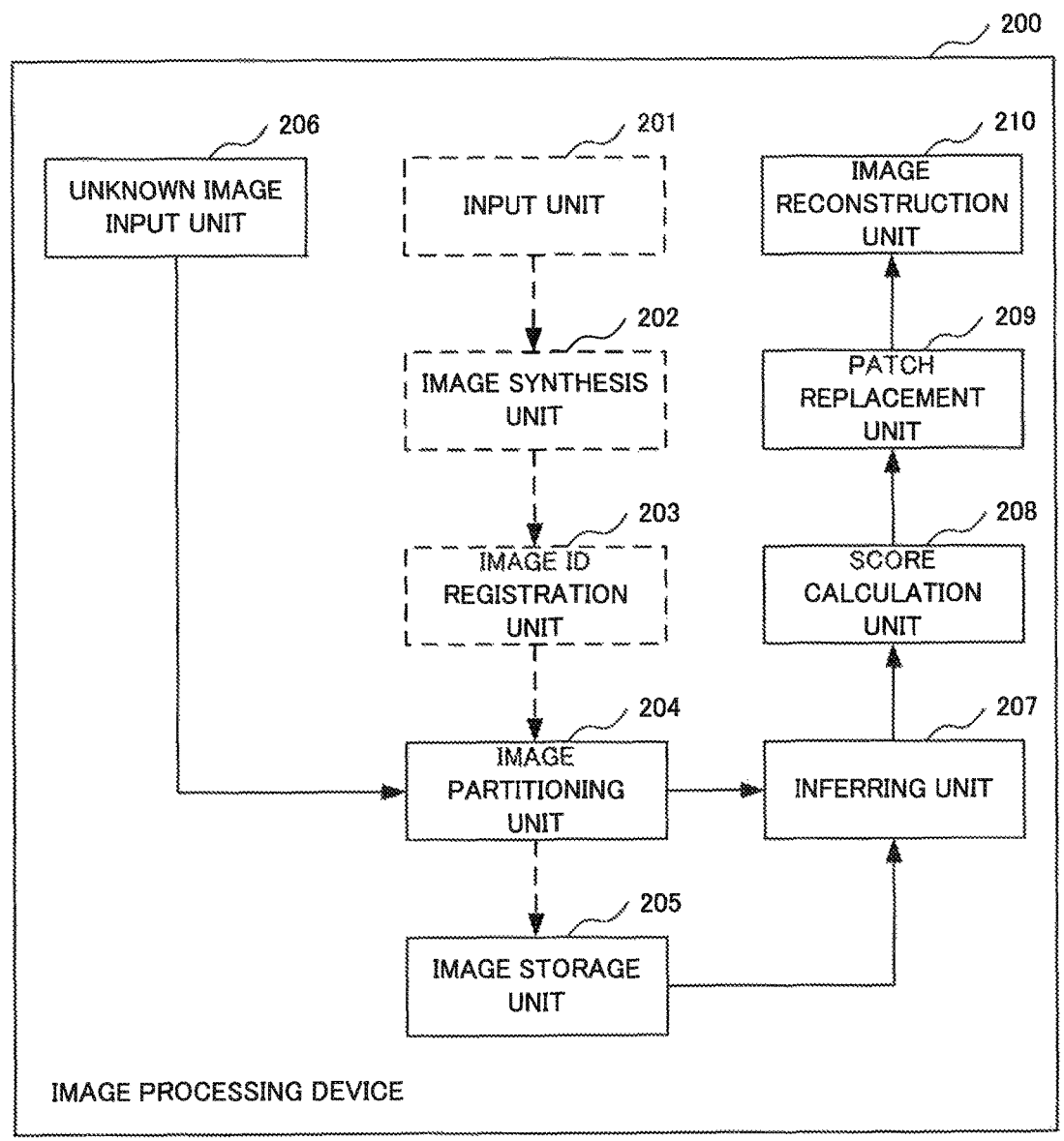
FIG. 7 is a block diagram showing the image processing device 200 according to the first exemplary embodiment of the present invention in the reconstruction phase.

FIG. 7 is a block diagram showing the image processing device 200 in the reconstruction phase. In the reconstruction phase, units which operate in the image processing device 200 are such as the image partitioning unit 204, the image storage unit 205, the unknown image input unit 206, the inferring unit 207, the score calculation unit 208, the patch replacement unit 209 and the image reconstruction unit 210. In FIG. 7, other units are drawn by broken lines.

According to FIG. 6, first, the unknown image input unit 206 receives a low resolution unknown face image (Step S201). Then the image partitioning unit 204 partitions the unknown face image into the overlapping unknown face image patches (Step S202). As described above, the size of the unknown face image patches can be decided arbitrarily or by experiment.

The inferring unit 207 selects a set of candidate patches at each location of the unknown face image. The "location" may indicate one of the unknown face image patches (Step S203). In this case, the inferring unit 207 selects, among the patches stored in the image storage unit 205, a set of candidate patches which best explain each of the unknown face image patches in Step S203. The inferring unit 207 may select, among the patches associated with each of the IDs, the patch most similar to each of the unknown face image patches as one of the candidate patches. The inferring unit 207 may select at most one candidate patch among the patches associated with each of the IDs for each of the unknown face image patches. For each of the unknown face image patches, the inferring unit 207 may select the input patches whose degrees of similarity to the unknown face image patch exceed a threshold as the candidate patches for the unknown face image patch. The inferring unit 207 may determine a sequence of the candidate patches in the set to assign a sequential number to each of the candidate patches in the set, for example, on the basis of the degrees of similarity to the concerning unknown face image patch. In Step S203, inferring unit 207 may provisionally select the nearest neighbour patch, which is the patch most similar to the unknown face image patch, as the selected patch for each of the unknown face image patches.

The score calculation unit 208 calculates the scores of the candidate patches selected by the inferring unit 207 for the unknown face image patches (Step S204). Math. 1 shows an example of an equation to calculate the scores of the candidate patches. Each of the candidate patches are correlated with one of the IDs. Therefore, for each of the candidate patches, the score of the candidate patch is regarded as the score of the ID that is correlated with the candidate patch. The scores are calculated with the misclassification measure in GLVQ (Generalized Learning Vector Quantization). The equation shown in Math. 1 represents the score of each ID for each candidate patch. The score calculation unit 208 calculates the score of each of the candidate patches according to, for example, the equation represented by Math. 1. In Math. 1 and Math. 2 described below, r is a sequential number assigned to the candidate patch, d(r) is, for example, a L2 norm distance between the unknown image patch and the r-th candidate patch. As described above, the 1st patch is the nearest neighbour patch.

$$\text{score}(ID) = \begin{cases} \dfrac{d(2)}{d(1)+d(2)}, & r = 1 \text{(nearest neighbour)} \\ \dfrac{d(1)}{d(1)+d(r)}, & r > 1 \end{cases} \quad \text{[Math. 1]}$$

Another example of the equation to calculate the score of the candidate patches is shown in Math. 2, which simply uses the inversely proportional relationship between score and L2 norm distance.

$$\text{score}(ID) = \dfrac{1}{d(r)} \quad \text{[Math. 2]}$$

The score calculation unit 208 calculates, for each of the IDs, the sum of the scores of the candidate patches correlated with the same ID within a certain area surrounding each of the locations (Step S205). As described above, the "location" may indicate one of the unknown face image patches. In this case, the score calculation unit 208 calculates, for each of the IDs, the sum of the scores of the candidate patches correlated with the same ID within a certain area surrounding each of the unknown face image patches. The certain area is, for example, 3×3 unknown face image patches surrounding the selected unknown face image patch as the center of the 3×3 unknown face image patches. The certain area may be other than the 3×3 unknown face image patches. The unknown face image patches within the certain area may be described as "local unknown patches" in the following.

The score calculation unit 208 selects one of the locations among the locations that is not selected (Step S206). As described above, the "location" may indicate one of the unknown face image patches. In Step S206, the score calculation unit 208 may select one of the unknown face image patches among the unknown face image patches that are not selected.

FIG. 8 is a diagram illustrating an example of scores of surrounding area around the patch under consideration. A group of quadrangles 401 represents the scores of one of the subject IDs for the candidate patches for the input image. Each of the quadrangles 402 represents a score, which is described as the "scores 402" in the following. The scores 402 of each of the IDs for each of the candidate patches are calculated by, for example, Math. 1. The score calculation unit 208 sums up the scores 402 of each of the IDs for each of the candidate patches in the certain area, which is illustrated as hatched quadrangles 404 surrounding the patch under consideration 403. Each subject ID has a sum of scores in the area 404. Size of the area of the surrounding area 404 is decided arbitrarily or by experiment. In the example shown in FIG. 8, the surrounding area is 3×3 patches. The ID whose sum of scores calculated by the score calculation unit 208 is the highest for each of the unknown face image patches is described as "the highest score ID" in the following.

The patch replacement unit 209 selects the candidate patch that is correlated with the subject ID whose score is the highest among subject IDs for the selected unknown image patch by, for example, the operation in Step S206, Step S207 and Step S208.

The patch replacement unit 209 replaces the nearest neighbour patch inferred by the inferring unit 207 by the patch taken from the subject ID, which is also described as "ID" above, with the highest score calculated in the score calculation unit 208 (Step S208), when the highest score ID is not the same as the ID of the nearest neighbour patch (NO in Step S207). In Step S208, the patch replacement unit 209 selects the patch taken from the subject ID with highest score calculated in the score calculation unit 208 instead of the nearest neighbour patch inferred by the inferring unit 207. If the highest score ID is the same as the ID of the nearest neighbour patch (YES in Step S207), the nearest neighbour is selected without patch replacement (Step S209). If there is a location which is not selected (NO in Step S210), the image processing device 200 repeats the operations from Step S206. The operations from Step S205 to Step S210 are repeated for all patches on the image.

After repeating the operations from Step S206 to Step S210 for all patches on the image (YES in Step S210), the image reconstruction unit 210 combines the selected patches, which are selected in Step S208 or Step S209, to reconstruct a high resolution image (S211). The image reconstruction unit 210 combines the selected patches by, for example, taking average in the overlapping regions of the selected patches, or by taking linear combinations of the overlapping regions of the selected patches.

Sharper high resolution images which are far away from mean face can be constructed by the image processing device 200 according to the first exemplary embodiment, because patch replacement unit 209 replaces some nearest neighbour patches by patches coming from only few subjects, preserving the details on the overlapping regions of the selected patches.

Only patches coming from few subjects are used to reconstruct the high resolution image, because the score calculation unit 208 calculates the scores for all candidate patches by using additional subject ID and spatial information, the patches having high scores tend to come from only few subjects.

In order to reconstruct sharp high resolution image and image similar to the original image, the image processing device 200 uses additional information of subject ID and spatial information of patches.

The image processing device 200 registers the subject ID of image patches during the training phase. An additional step of patch replacement is also added to the reconstruction phase. The patch replacement step uses subject ID information and spatial information (information of surrounding patches at each location on the input query image) to determine which candidate patch best explains the unknown observed patch.

At each location on the input query image, subject ID scores are calculated for all surrounding candidate patches within a certain area (for example, area of the surrounding 8 patches). Patches coming from the subject ID whose score is highest within the area under consideration will be given larger weight than other candidate patches. Therefore, patches coming from subject IDs whose patches are selected in the surrounding area are more likely to be selected at that location.

Figure 1:
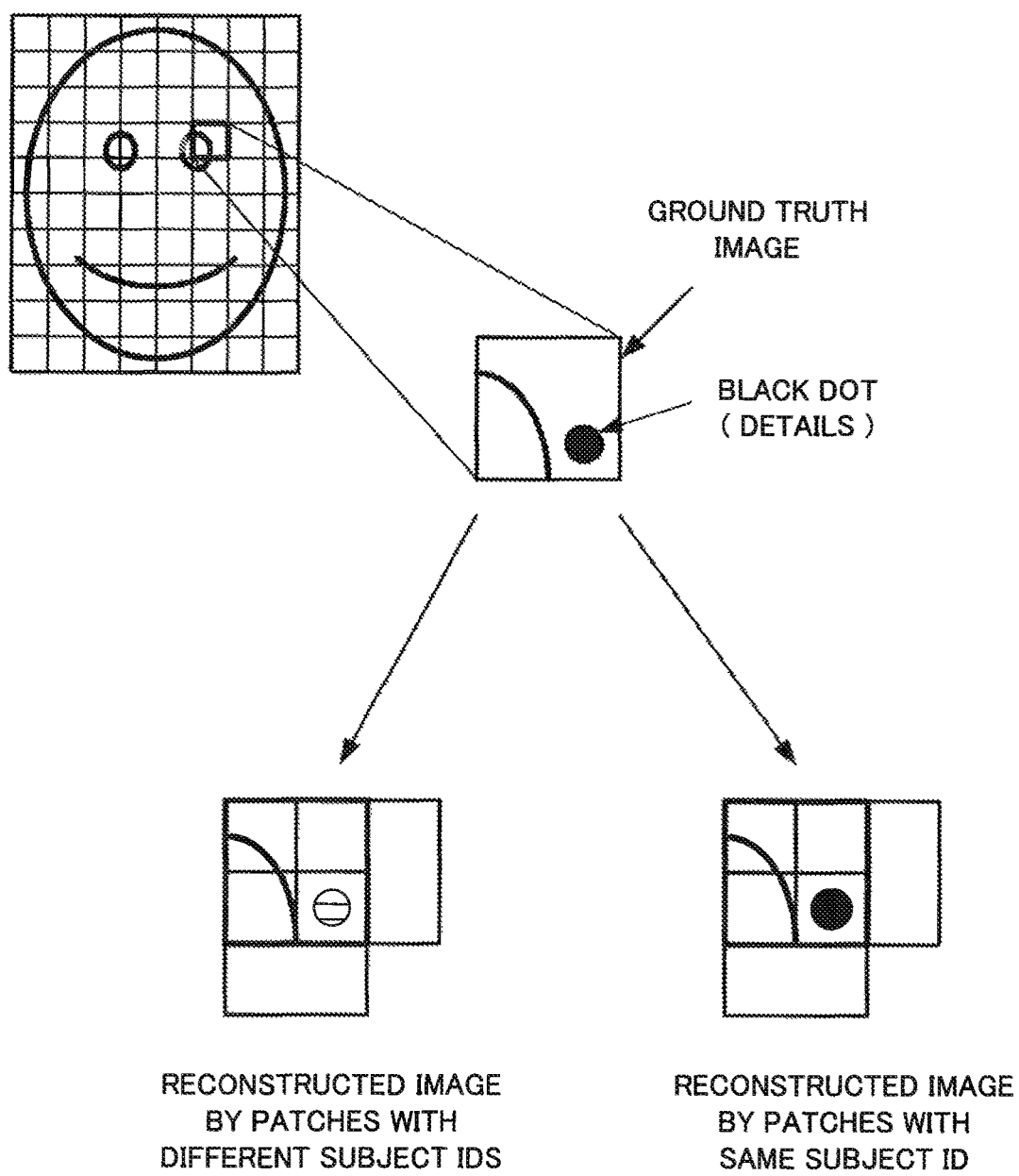
FIG. 1 is a diagram schematically illustrating a difference between a reconstructed image by patches with different subject IDs and a reconstructed image by patches with a same subject ID.

With the image processing device 200, the reconstructed images are sharper than those reconstructed with methods disclosed in the documents described above as the background arts. The reason is the image processing device 200 ensures more patches chosen from the same subject ID, preserving the details in the selected patches. FIG. 1 is a diagram schematically illustrating a difference between a reconstructed image by patches with different subject IDs and a reconstructed image by patches with the same subject ID. As shown in FIG. 1, for example, in which the black dot (the details) is averaged out by other patches selected from different subject IDs during overlapping on the left, while the black dot (the details) is preserved as patches selected from the same subject ID all have the black dot at that position, and hence the details are not averaged out, producing sharper images.

The image processing device 200 also produces high resolution image closer to the ground truth of the unknown input image. The reason is the image processing device 200 prevents the resulting image from being not sharp (consisting of patch mixture of too many subjects IDs). If mate images are included in the database, the image processing device 200 can reconstruct high resolution image close to ground truth by using patches mostly from the mate images. If mate images are not included in the database, the image processing device 200 still reconstructs sharp images, with patches selected from few subjects. Hence the number of subjects used in the reconstruction can also help to determine whether the mate is registered in the database.

Second Exemplary Embodiment

A second exemplary embodiment of the present invention will be explained in details with reference to drawings.

Figure 9:
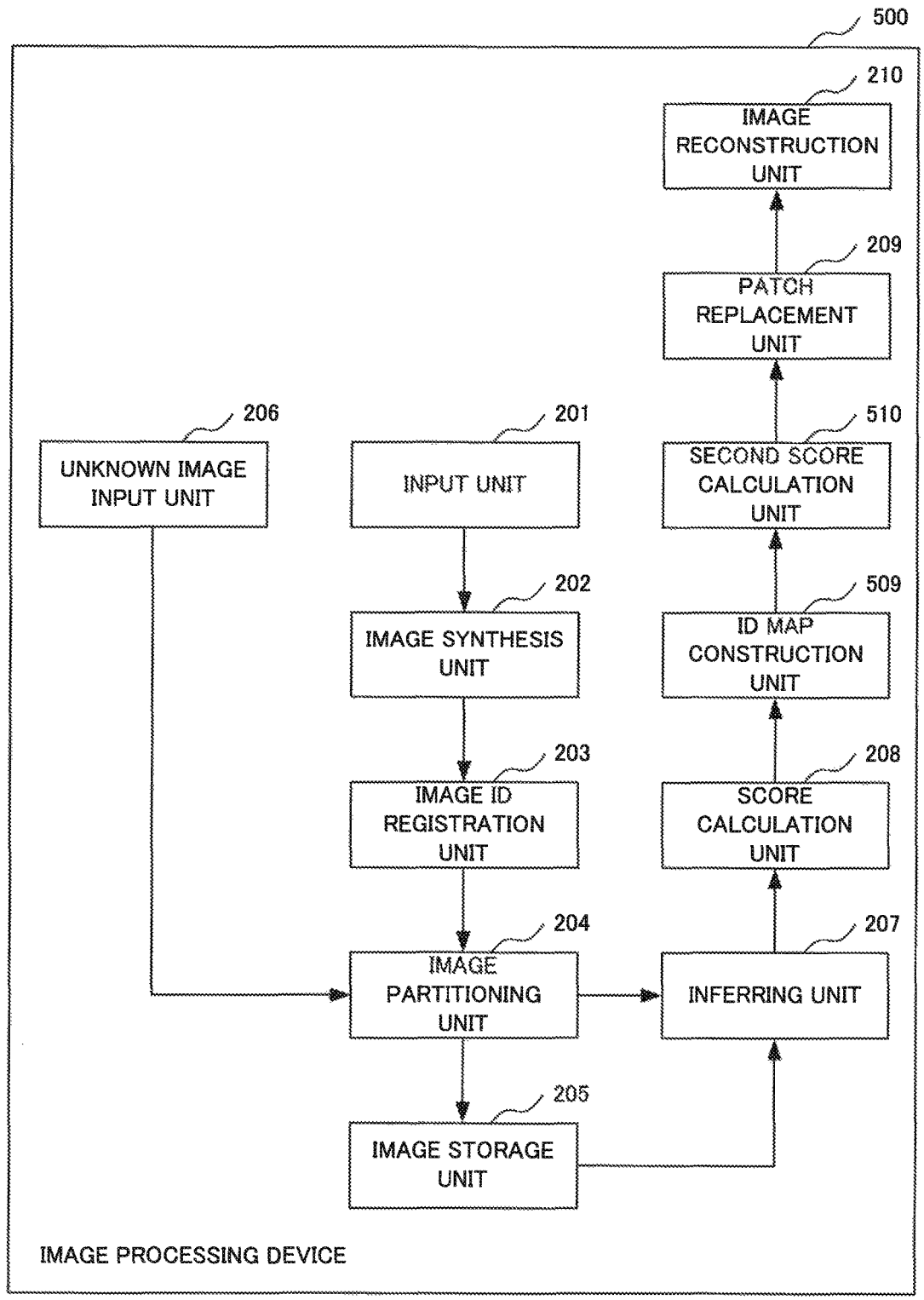
FIG. 9 is a block diagram showing a structure of an image processing device 500 according to the second and a third exemplary embodiments of the present invention.

FIG. 9 is a block diagram showing a structure of an image processing device 500 according to the second exemplary embodiment of the present invention.

The image processing device 500 includes the same components as the components included in the image processing device 200 of the first exemplary embodiment. The same codes as the codes of the components included in the image processing device 200 is assigned to the same components as the components included in the image processing device 200. The detailed explanation of those components is omitted. The image processing device 500 further includes an ID map construction unit 509 and a second score calculation unit 510.

The ID map construction unit 509 constructs an ID map by using the highest score subject ID at each of the patches of the low resolution unknown input image. The second score calculation unit 510 re-calculates the scores of all candidate patches obtained by the inferring unit 207 by considering the area occupied by each of the subject IDs.

Next, operations of the image processing device according to the exemplary embodiment will be explained in detail with reference to drawings.

Figure 10:
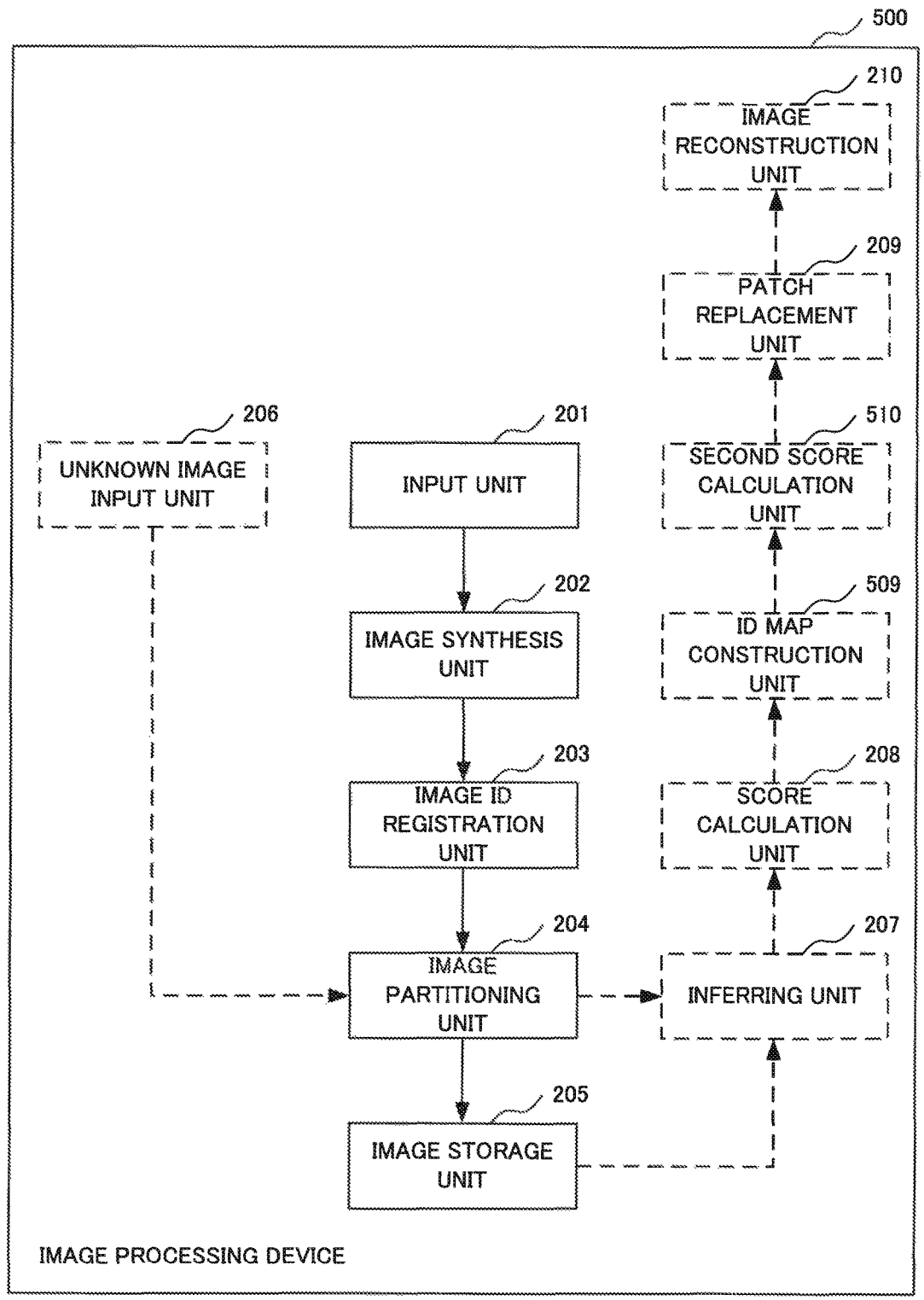
FIG. 10 is a block diagram showing the image processing device 500 according to the second and the third exemplary embodiment of the present invention in the training phase.

FIG. 10 is a block diagram showing the image processing device 500 in the training phase. In the training phase, units which operate in the image processing device 200 are such as the input unit 201, the image synthesis unit 202, the image ID registration unit 203, the image partitioning unit 204 and the image storage unit 205. In FIG. 10, other units are drawn by broken lines.

FIG. 4 is a flow chart showing an example of operation of the image processing device 500 in the training phase. The operation of the image processing device 500 in the training phase is the same as the operation of the image processing device 200 according to the first exemplary embodiment in the training phase. Therefore, detailed explanation of the operation of the image processing device 500 in the training phase is omitted.

Figure 11:
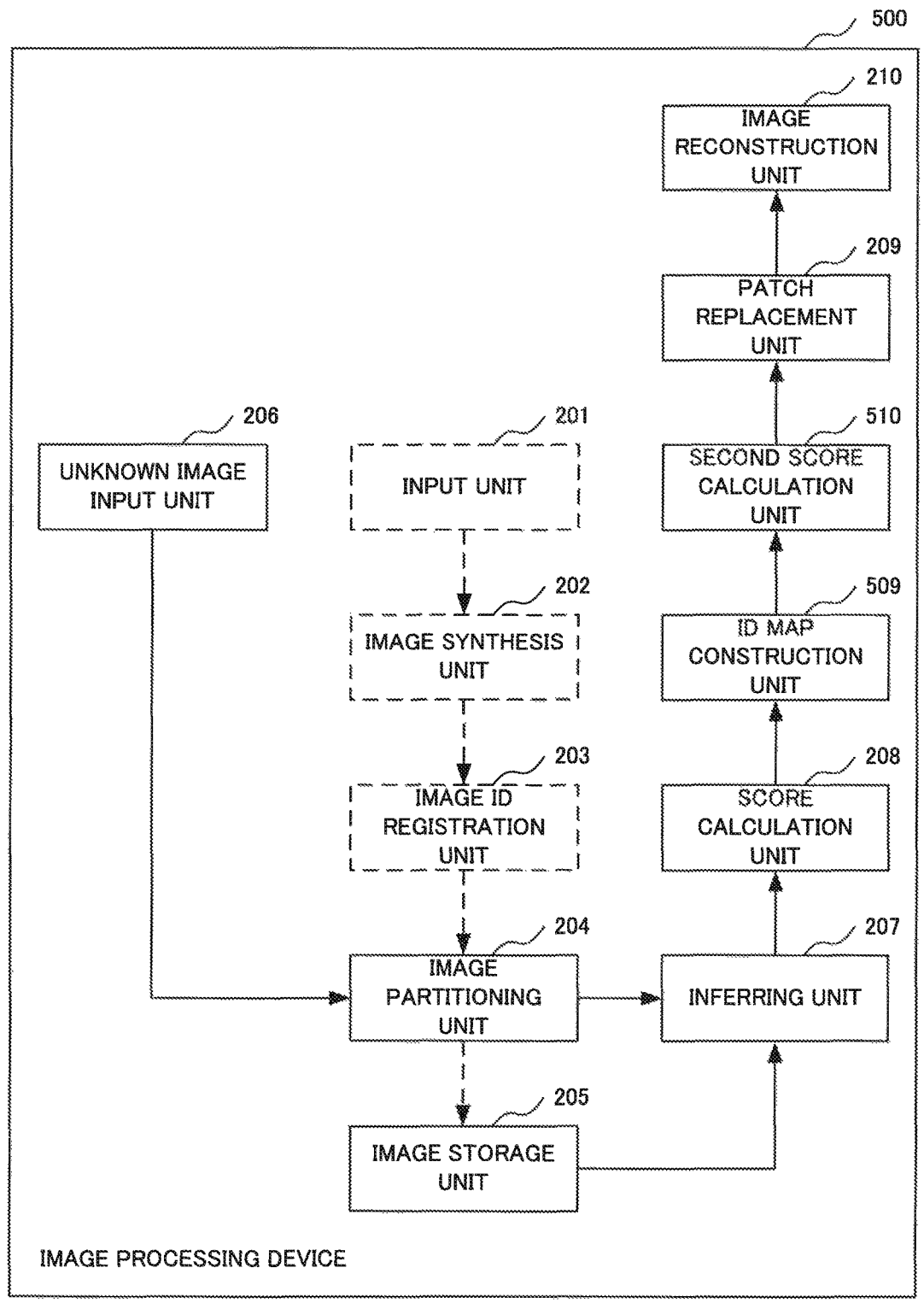
FIG. 11 is a block diagram showing the image processing device 500 according to the second and the third exemplary embodiments of the present invention in the reconstruction phase.

FIG. 11 is a block diagram showing the image processing device 500 in the reconstruction phase. In the reconstruction phase, units which operate in the image processing device 500 are such as the image partitioning unit 204, the image storage unit 205, the unknown image input unit 206, the inferring unit 207, the score calculation unit 208, the ID map construction unit 509, the second score calculation unit 510, the patch replacement unit 209 and the image reconstruction unit 210. In FIG. 11, other units are drawn by broken lines.

Figure 12:
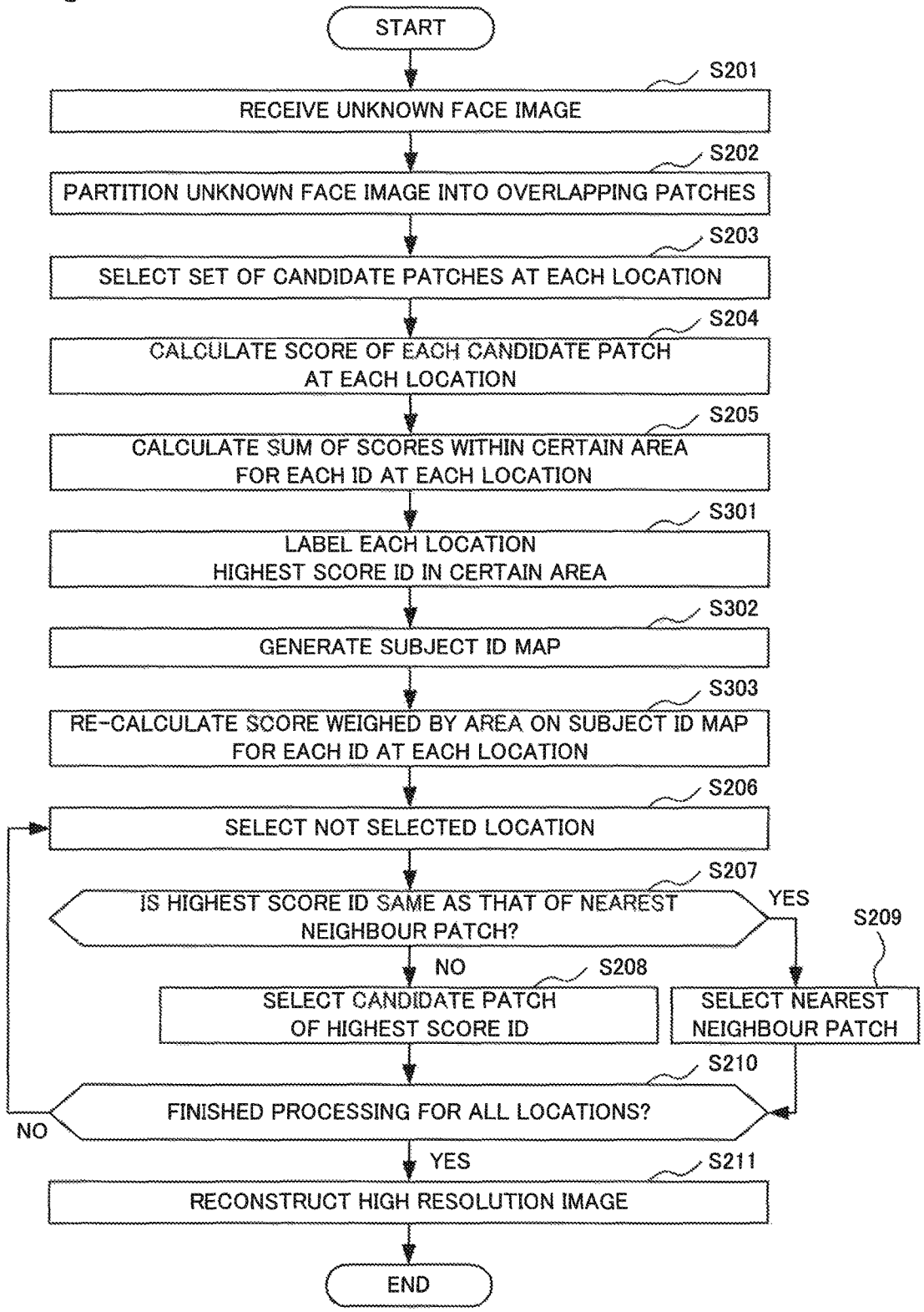
FIG. 12 is a flow chart showing an example of operation of the image processing device 500 according to the second and third exemplary embodiments of the present invention in the reconstruction phase.

FIG. 12 is a flow chart showing an example of operation of the image processing device 500 in the reconstruction phase.

Steps shown in FIG. 12 are the same as the steps of the first exemplary embodiment, which are shown in FIG. 6, except for Step S301, Step S302 and Step S303. The same codes as the codes of the steps shown in FIG. 6 are assigned to the same steps as the steps shown in FIG. 6, and detailed explanation of those steps is omitted.

After the score calculation unit 208 has calculated the scores of all the candidate patches selected by the inferring unit 207 (Step S204), the ID map construction unit 509 labels each of the unknown face image patches with the subject ID with the highest score in the surrounding area of the unknown face image patch under consideration (Step S301). For each of the locations, that is, the unknown face image patches in the unknown face image, the ID map construction unit 509 selects, as a label for the unknown face image patch, the subject ID with the highest score in the surrounding area of the unknown face image patch. After the ID map construction unit 509 has labelled all the unknown face image patches of the unknown input image, the ID map construction unit 509 constructs, that is, generates, a subject ID map for the unknown input image (Step S302). The subject ID map may be a table in which, for each of the unknown face image patches, the unknown face image patch is related with the subject ID which is selected for the unknown face image patch.

Figure 13:
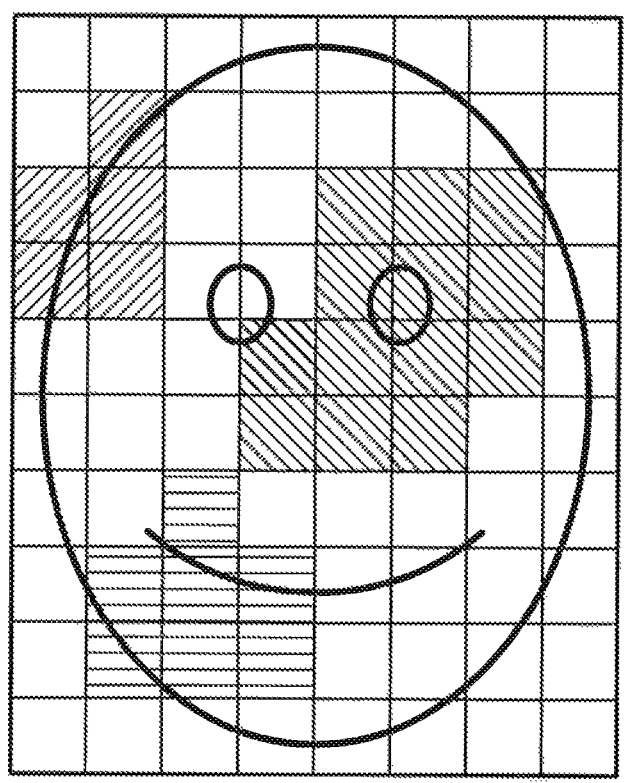
FIG. 13 is a diagram showing a visualized example of the subject ID map.

FIG. 13 is a diagram showing a visualized example of the subject ID map, in which areas with the same pattern indicate areas labelled with the same subject ID.

The second score calculation unit 510 calculates a score of each of the candidate patches obtained by the inferring unit 207 (Step S303). Math. 3 is an equation showing an example of the score of each of the candidate patches, which is calculated with the misclassification measure in GLVQ together with the weight which is proportional to the area labelled with each subject ID:

$$\text{score}(ID) = \begin{cases} \left(\dfrac{d(2)}{d(1)+d(2)}\right)\text{area}(ID), & r=1 \text{(nearest neighbour)} \\ \left(\dfrac{d(1)}{d(1)+d(r)}\right)\text{area}(ID), & r>1 \end{cases} \quad [\text{Math. 3}]$$

where area(ID) is the number of patches labelled with ID in the ID map.

The image processing device 500 according to the second exemplary embodiment further limits the number of subjects from which patches are chosen, because the second score calculation unit 510 re-calculates the scores with weights proportional to the area labelled by the subject IDs. Patches from subject IDs which occupy larger area on the unknown input image will more likely to obtain higher score in the second score calculation unit 510. Therefore, the image reconstruction unit 210 is able to reconstruct sharper images compared with the unknown face image. In case the input unit 201 receives mate images and hence the image storage unit 205 stores mate image patches, the second exemplary embodiment increases the patches selected from the mate image patches, reconstructing images close to the original mate ones.

Third Exemplary Embodiment

Next, a third exemplary embodiment of the present invention will be explained in details with reference to drawings.

In the exemplary embodiment of the present invention, high resolution details are estimated from a downsized, blurred face image, with mate face images included in the training database.

FIG. 9 is a diagram showing an example of a structure of an image processing device 500 according to the exemplary embodiment. The image processing device 500 according to the exemplary embodiment has the same structure as the structure of the image processing device 500 according to the second exemplary embodiment. Each of the components of the image processing device 500 according to the exemplary embodiment is the same as the component with the same code in the image processing device 500 according to the second exemplary embodiment except the following difference.

The image synthesis unit 202 generates the normalized input images, which is described as the "training images", by normalizing the input images. The image synthesis unit 202 further generates degraded training images by degrading, that is, downsizing and/or blurring, the normalized input face images. The image synthesis unit 202 degrades (for example, downsizes and blurs) the normalized input face images so that the level of degrading of the degraded training images is similar to that of the low resolution unknown input image (that is, the low resolution unknown face image). The level of degrading of low resolution unknown input images (the low resolution unknown face image) can be estimated by, for example, subspace analysis described in M. Nishiyama, A. Hadid, H. Takeshima, J. Shotton, T. Kazakaya, O. Yamaguchi, "Facial Deblur Inference using subspace analysis for recognition of blurred faces", IEEE Trans. Pattern Anal. Mach. Intell., Vol. 44, no. 4, pp. 838-845, 2011. The level of degrading may be determined manually by a user of the image processing device 500 via a terminal device (not illustrated) which is communicably connected with the image processing device 500.

The image partitioning unit 204 partitions the training images into the overlapping patches. The overlapping patches generated by partitioning the training images are described as the "training patches" or the "high resolution training patches" in the following. The image partitioning unit 204 further partitions the degraded training images into the overlapping patches. The overlapping patches generated by partitioning the degraded training patches are described as the "degraded training patches" in the following. The image partitioning unit 204 partitions the training images and the degraded training images so that each of the degraded training patches is a degraded image of one of the training patches. For each of the degraded training patches, the image partitioning unit 204 generates a pair of the degraded training patch and the high resolution training patch the degraded image of which is the degraded training patch. The pair of the degraded training patch and the training patch is described as a "patch pair" in the following. The image partitioning unit 204 further correlates, for each of the training images, each of the patch pairs generated from the training image with the subject ID of the training image. The image partitioning unit 204 stores the subject IDs and the image pairs, each of which is correlated with one of the subject IDs, in the image storage unit 205. The subject ID which is correlated with a patch pair included in the patch pairs is also correlated with the degraded training patch and the training patch which are included in the patch pair.

The image storage unit 205 stores the subject IDs of the input images and the patch pairs, each of which is correlated with one of the subject IDs.

The inferring unit 207 select, for each input query patches, a set of candidate patches among the degraded training patches included in the patch pairs stored in the image storage unit 205. The input query patches are overlapping patches into which the low resolution unknown face image (that is, the input query image) is partitioned by the image partitioning unit 204. The inferring unit 207 may select, for each of the input query patches, the degraded training patch most similar to the input query patch among the degraded training patches that are correlated with each of the subject ID as one of the candidate patches for the input query patch.

The image reconstruction unit 210 combines the training patches which are included in the patch pairs which includes the selected degraded training patches, which are the nearest neighbour patch which are not replaced by the patch replacement unit 209 and the replaced patches with the highest scores, to reconstruct a high resolution image.

Next, operation of the image processing device 500 according to the exemplary embodiment will be explained in detail with reference to drawings.

Figure 14:
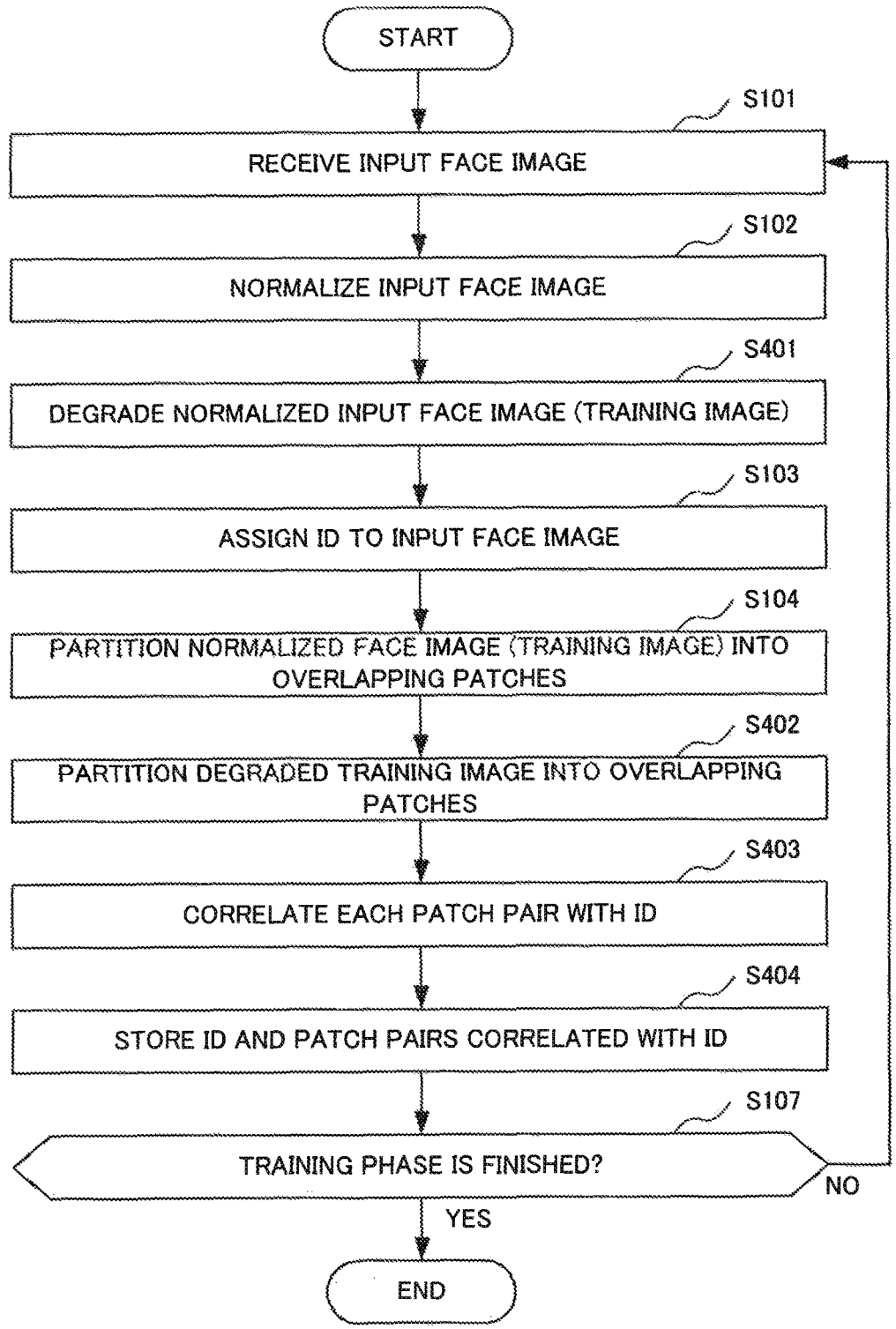
FIG. 14 is a flowchart showing an example of operation of the image processing device 500 according to the third exemplary embodiment of the present invention in the training phase.

FIG. 14 is a flowchart showing an example of operation of the image processing device 500 according to the exemplary embodiment in the training phase. The same codes are assigned to the steps which are the same as the steps shown in FIG. 4 and explanation of those steps is omitted.

The image synthesis unit 202 generates the training images by degrading the normalized input images (that is, the normalized high resolution face images) (Step S401). The training images are obtained from the normalized high resolution face images. In training phase, the image synthesis unit 202 downsizes and blurs these training images so that the level of downgrading is similar to the low resolution unknown input image. As described above, the level of degrading of the low resolution images can be estimated by, for example, subspace analysis described in the Non-Patent Document 2. The training images can also be downsized and blurred to any level of downgrading manually. After downsizing and blurring, the image partitioning unit 204 partitions the training images into overlapping patches, that is, the high resolution training patches (the training patches) (Step S104). The image partitioning unit 204 also partitions the degraded training images into overlapping patches, that is, the downgraded training patches (Step S402). The image partitioning unit 204 links each of the downgraded training patches with the associated high resolution training patch, making a patch pair including the downgraded training patch and the high resolution patch which are linked. The subject ID of each training image is also registered by the image ID registration unit 203 in the training phase, such that each training patch pairs carries a subject ID. The subject IDs can be assigned to correspond to the identities of faces imaged in the training images. The subject IDs can also be assigned and clustered according to other characteristics of the images, such as gender, age, etc.

FIG. 12 is a flowchart showing an example of operation of the image processing device 500 according to the exemplary embodiment in the reconstruction phase. The explanation below is focused mainly on the difference between the operation of the image processing device 500 according to the exemplary embodiment and the operation of the image processing device 500 according to the second exemplary embodiment. Detailed explanation on the same operation as that of the image processing device 500 according to the second exemplary embodiment is omitted.

In reconstruction phase, a low resolution, blurred unknown face image is input into the system (Step S201). The image partitioning unit 204 partitions the unknown input image into overlapping patches, that is, the input query patches (Step S202). For each of the input query patches, the inferring unit 207 searches for and selects a set of candidate patches which is nearest to the input query patch among the degraded training patches in the dictionary (that is, the image storage unit 205) (Step S203). Each of the candidate patches in the set carries a subject ID. For each of the input query patches, the score calculation unit 208 calculates the score of each of the subject IDs inside the set of the candidate patches, so that in the end the score of each of the subject IDs at each of the input query patches is obtained (Step S204).

The score calculation unit 208 calculates the sum of score of each of the subject IDs in the area surrounding each of the input query patches (Step S204). The area can be determined manually or by experiments. For examples, the area in which the sum is calculated can be set to be the area within 3×3 patches surrounding each of the input query patches. The ID map construction unit 509 labels the input query patch under consideration by the subject ID which has the largest sum of scores in the area under consideration (Step S301). In other words, the ID map construction unit 509 selects the subject ID whose sum of scores is largest in the area surrounding each of the input query patches. The ID map construction unit 509 generates the subject ID map according to the selected subject ID and the location of each of the input query patches (Step S302). With all the input query patches labelled, the subject ID map is obtained.

The second score calculation unit 510 then re-calculates the scores of the candidate patches of each of the subject IDs at each of the input query patches by weighting the scores by the area of the subject ID on the subject ID map (Step S303). For the selected input query patch, the patch replacement unit 209 selects the candidate patch with the highest score for reconstruction of the high resolution image (Step S207). The process is repeated for all the input query patches on the input query image (Step S209). The image reconstruction unit 210 reconstructs a high resolution image with respect to the selected candidate patches (Step S211). Specifically, the image reconstruction unit 210 reconstructs the high resolution image by combining the training patches each of which is included in the patch pairs including one of the selected candidate patches.

In the reconstruction phase, patches are selected more correctly with information of surrounding candidate patches and their subject IDs. Especially with face image of mate subject in the training database, which is the patch pairs and the associated subject IDs stored in the image storage unit 205, even only part of the patches are selected correctly by the method disclosed in the documents described above as the background arts (i.e. by only using the nearest neighbour patch), wrongly selected patches can be replaced by correct patches by using subject ID information of other patches in the whole image.

Modification of Third Exemplary Embodiment

The image processing device 200 according to a modification of the third exemplary embodiment may have the same structure as that of the image processing device 200 according to the first exemplary embodiment shown in FIG. 2. In this case, the image synthesis unit 202, the image partitioning unit 204, the image storage unit 205 and the image reconstruction unit 210 of the image processing device 200 according to the modification are the same as those of the image processing device 500 according to the third exemplary embodiment.

In the training phase, the image processing device 200 according to the modification operates in the same way as the image processing device 500 according to the third exemplary embodiment. In the reconstruction phase, the image processing device 200 according to the modification operates in the same way as the image processing device 200 according to the first exemplary embodiment except Step S211 shown in FIG. 6. In Step S211, the image processing device 200 according to the modification operates in the same way as the image processing device 500 according to the third exemplary embodiment.

Fourth Exemplary Embodiment

Next, a fourth exemplary embodiment will be described in detail with reference to drawings.

Figure 15:
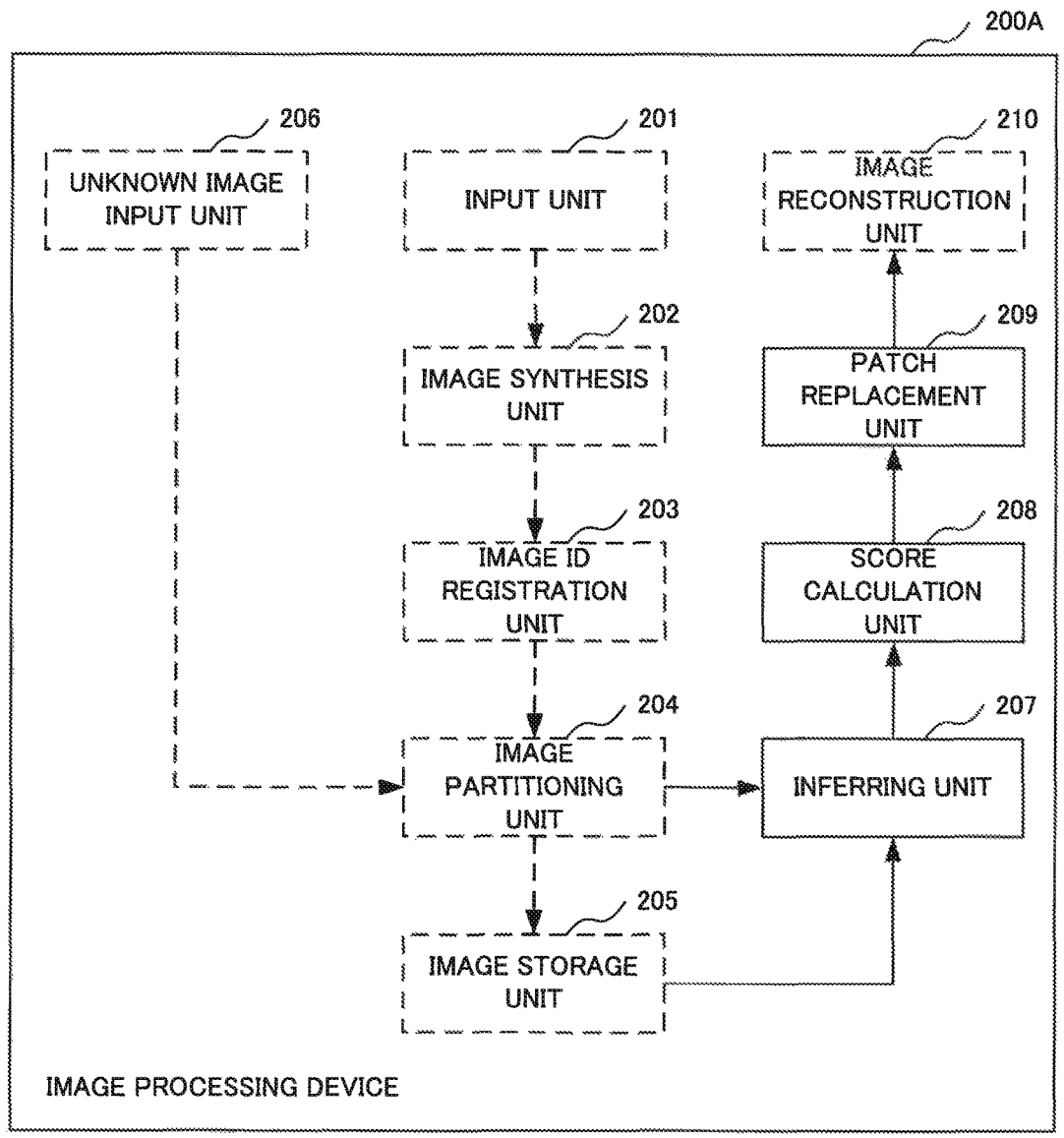
FIG. 15 is a block diagram showing an example of a structure of the image processing device 200A according to a fourth exemplary embodiment of the present invention.

FIG. 15 is a block diagram showing an example of a structure of an image processing device 200A according to the exemplary embodiment.

With reference to FIG. 15, the image processing device 200A according to the exemplary embodiment of the present invention includes: an inferring unit 207 which selects, for each of local unknown patches including a target unknown patch, candidate patches from a plurality of input patches based on similarity to the local unknown patch, the local unknown patches being images generated from a part of an unknown image, the plurality of input patches being images generated from a plurality of input images, a subject ID (Identifier) being correlated with the input patches that are generated from an input image to which the subject ID is assigned in the plurality of input image; a score calculation unit 208 which calculates a score representing nearness of a candidate patch in the candidate patches to a local unknown patch in the local unknown patches; and a patch replacement unit 209 which calculates a score summation for the subject ID by summing up scores of the candidate patches being correlated with a same subject ID in the candidate patches of the local unknown patches, and selects, as a selected patch being used for reconstruction of a reconstruction image, a candidate patch that is correlated with the subject ID for which the score summation is highest from the candidate patches selected for the target unknown patch.

The exemplary embodiment has the same effect as that of the first exemplary embodiment. The reason for the effect is the same as that of the first exemplary embodiment.

Other Exemplary Embodiment

Each of the image processing device 200, the image processing device 200A and the image processing device 500 can be implemented using a computer and a program controlling the computer, dedicated hardware, or a set of a computer and a program controlling the computer and a dedicated hardware.

Figure 16:
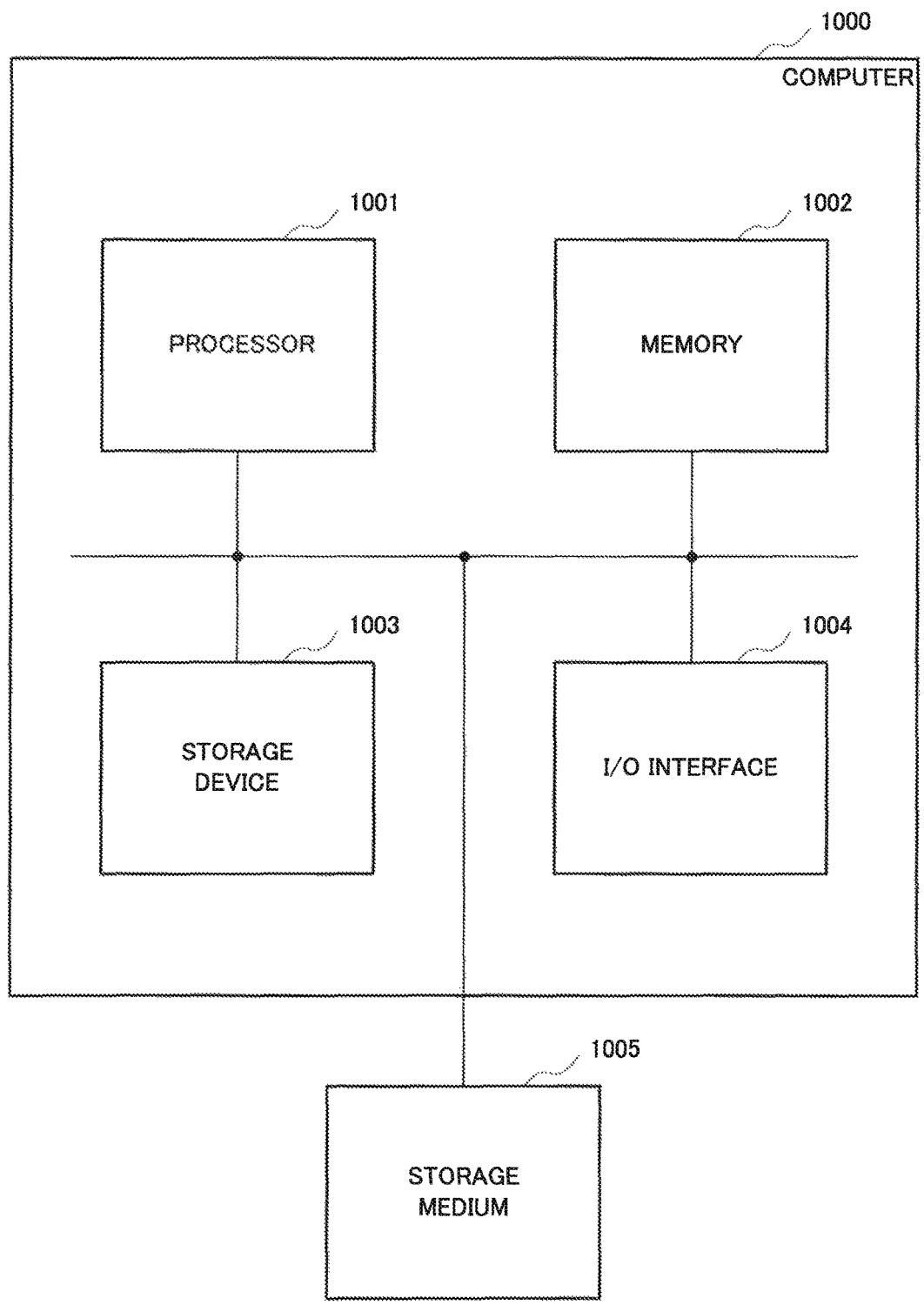
FIG. 16 is a block diagram showing an example of a hardware structure of a computer 1000 which is able to realize the image processing device according to the exemplary embodiments of the present invention.

FIG. 16 is a block diagram showing an example of a hardware structure of a computer 1000 which is able to realize the image processing device 200, the image processing device 200A and the image processing device 500. With reference to FIG. 16, the computer 1000 includes a processor 1001, a memory 1002, a storage device 1003 and an I/O (Input/Output) interface 1004. The computer 1000 can access a storage medium 1005. Each of the memory 1002 and the storage device 1003 may be a storage device, such as a RAM (Random Access Memory), a hard disk drive or the like. The storage medium 1005 may be a RAM, a storage device such as a hard disk drive or the like, a ROM (Read Only Memory), or a portable storage medium. The storage device 1003 may operate as the storage medium 1005. The processor 1001 can read data and a program from the memory 1002 and the storage device 1003, and can write data and a program in the memory 1002 and the storage device 1003. The processor 1001 can communicate with a terminal device (not illustrated) and the like over the I/O interface 1004. The processor 1001 can access the storage medium 1005. The storage medium 1005 stores a program that causes the computer 1000 to operate as the image processing device 200, the image processing device 200A or the image processing device 500.

The processor 1001 loads the program, which causes the computer 1000 operates as the image processing device 200, the image processing device 200A or the image processing device 500, stored in the storage medium 1005 into the memory 1002. The computer 1000 operates as the image processing device 200, the image processing device 200A or the image processing device 500 by executing the program loaded in the memory 1002.

The input unit 201, the image synthesis unit 202, the image ID registration unit 203, the image partitioning unit 204, the unknown image input unit 206, the inferring unit 207, the score calculation unit 208, the patch replacement unit 209, the image reconstruction unit 210, the ID map calculation unit 509, and the second score calculation unit 510 can be realized by a dedicated program that is loaded in the memory 1002 from the storage medium 1005 and can realize each of the above-described units, and the processor 1001 which executes the dedicated program. The image storage unit 205 can be realized by the memory 1002 and/or the storage device such as a hard disk device or the like. A part of or all of the input unit 201, the image synthesis unit 202, the image ID registration unit 203, the image partitioning unit 204, the image storage unit 205, the unknown image input unit 206, the inferring unit 207, the score calculation unit 208, the patch replacement unit 209, the image reconstruction unit 210, the ID map calculation unit 509, and the second score calculation unit 510 can be realized by a dedicated circuit that realizes the functions of the above-described units.

A part or all of the above-described exemplary embodiments may be described as the following supplementary notes, but are not limited by the following.

<Supplementary Note 1>

An image processing device including:

inferring means for selecting, for each of local unknown patches including a target unknown patch, candidate patches from a plurality of input patches based on similarity to the local unknown patch, the local unknown patches being images generated from a part of an unknown image, the plurality of input patches being images generated from a plurality of input images, a subject ID (Identifier) being correlated with the input patches that are generated from a input image to which the subject ID is assigned in the plurality of input image;

first score calculation means for calculating a score representing nearness of a candidate patch in the candidate patches to a local unknown patch in the local unknown patches; and patch replacement means for calculating a score summation for the subject ID by summing up scores of the candidate patches being correlated with a same subject ID in the candidate patches of the local unknown patches, and selecting, as a selected patch being used for reconstruction of a reconstruction image, a candidate patch that is correlated with the subject ID for which the score summation is highest from the candidate patches selected for the target unknown patch.

<Supplementary Note 2>

The image processing device according to supplementary note 1, further including:

second score calculation means for counting, for the subject ID assigned to the candidate patches, a number of the candidate patches nearest to any one of the local unknown patches based on the scores, and re-calculating the scores of the candidate patches based on the numbers for the subject ID assigned to the candidate patches.

<Supplementary Note 3>

The image processing device according to supplementary note 1 or 2, further including:

image partitioning means for generating the input patches from the input images and the local unknown patches from the unknown images by partitioning allowing overlap; and image ID registration means for correlating an object input patch in the input patches with the subject ID assigned to the input image from which the object input patch is generated.

<Supplementary Note 4>

The image processing device according to supplementary note 3, further including:

image synthesis means for normalizing the input images so that corresponding feature points are at same positions in the input images; and image reconstruction means for reconstructing the reconstruction image by using the selected patch, wherein the image partitioning means partitions the normalized input images into the input patches so as to be allowed to overlap and partitions the unknown image into unknown patches so as to be allowed to overlap, the unknown patches being images in which the local unknown patches are included.

<Supplementary Note 5>

The image processing device according to supplementary note 3, further including:

image synthesis means for normalizing the input images so that corresponding feature points are at same positions in the input images, and degrading the normalized input images, wherein the image partitioning means partitions the normalized and degraded input images into the input patches so as to be allowed to overlap, generates a patch pair including each of the input patches and a reconstruction patch which is a part of the normalized input image so that the input patch included in each of the patch pairs corresponds to a degraded image of the reconstruction patch included in the patch pair, and partitions the unknown image into unknown patches so as to be allowed to overlap, the unknown patches being images in which the local unknown patches are included, and the image processing device further includes:

image reconstruction means for reconstructing the reconstruction image by using the reconstruction patch included in the patch pair including the selected patch.

<Supplementary Note 6>

The image processing device according to any one of supplementary notes 3 to 5, further including:

input means for receiving the plurality of input images;

unknown image input means for receiving the unknown image; and image storage means for storing the plurality of input patches, wherein the image ID registration means assigns the subject ID to each of the plurality of input images according the identity thereof, and the image partitioning means stores the plurality of input patches in the image storage means, the subject ID of the input image from which the input patch is generated being correlated with the input patch for each of the plurality of input patches.

<Supplementary Note 7>

An image processing method including:

selecting, for each of local unknown patches including a target unknown patch, candidate patches from a plurality of input patches based on similarity to the local unknown patch, the local unknown patches being images generated from a part of an unknown image, the plurality of input patches being images generated from a plurality of input images, a subject ID (Identifier) being correlated with the input patches that are generated from a input image to which the subject ID is assigned in the plurality of input image;

calculating a score representing nearness of a candidate patch in the candidate patches to a local unknown patch in the local unknown patches; and calculating a score summation for the subject ID by summing up scores of the candidate patches being correlated with a same subject ID in the candidate patches of the local unknown patches, and selecting, as a selected patch being used for reconstruction of a reconstruction image, a candidate patch that is correlated with the subject ID for which the score summation is highest from the candidate patches selected for the target unknown patch.

<Supplementary Note 8>

The image processing method according to supplementary note 7, further including:

counting, for the subject ID assigned to the candidate patches, a number of the candidate patches nearest to any one of the local unknown patches based on the scores, and re-calculating the scores of the candidate patches based on the numbers for the subject ID assigned to the candidate patches.

<Supplementary Note 9>

The image processing method according to supplementary note 7 or 8, further including:

generating the input patches from the input images and the local unknown patches from the unknown images by partitioning allowing overlap; and correlating an object input patch in the input patches with the subject ID assigned to the input image from which the object input patch is generated.

<Supplementary Note 10>

The image processing method according to supplementary note 9, further including:

normalizing the input images so that corresponding feature points are at same positions in the input images;

partitioning the normalized input images into the input patches so as to be allowed to overlap and partitions the unknown image into unknown patches so as to be allowed to overlap, the unknown patches being images in which the local unknown patches are included; and reconstructing the reconstruction image by using the selected patch.

<Supplementary Note 11>

The image processing method according to supplementary note 9, further including:

normalizing the input images so that corresponding feature points are at same positions in the input images, and degrading the normalized input images;

partitioning the normalized and degraded input images into the input patches so as to be allowed to overlap, generates a patch pair including each of the input patches and a reconstruction patch which is a part of the normalized input image so that the input patch included in each of the patch pairs corresponds to a degraded image of the reconstruction patch included in the patch pair, and partitions the unknown image into unknown patches so as to be allowed to overlap, the unknown patches being images in which the local unknown patches are included and reconstructing the reconstruction image by using the reconstruction patch included in the patch pair including the selected patch.

<Supplementary Note 12>

The image processing method according to any one of supplementary notes 9 to 11, further including:

receiving the plurality of input images;

receiving the unknown image;

assigning the subject ID to each of the plurality of input images according the identity thereof; and storing the plurality of input patches in image storage means, the subject ID of the input image from which the input patch is generated being correlated with the input patch for each of the plurality of input patches.

<Supplementary Note 13>

A computer readable storage medium storing a program causing a computer to operate as:

inferring means for selecting, for each of local unknown patches including a target unknown patch, candidate patches from a plurality of input patches based on similarity to the local unknown patch, the local unknown patches being images generated from a part of an unknown image, the plurality of input patches being images generated from a plurality of input images, a subject ID (Identifier) being correlated with the input patches that are generated from a input image to which the subject ID is assigned in the plurality of input image;

first score calculation means for calculating a score representing nearness of a candidate patch in the candidate patches to a local unknown patch in the local unknown patches; and patch replacement means for calculating a score summation for the subject ID by summing up scores of the candidate patches being correlated with a same subject ID in the candidate patches of the local unknown patches, and selecting, as a selected patch being used for reconstruction of a reconstruction image, a candidate patch that is correlated with the subject ID for which the score summation is highest from the candidate patches selected for the target unknown patch.

<Supplementary Note 14>

The computer readable storage medium according to supplementary note 13, storing a program causing a computer to operate as:

second score calculation means for counting, for the subject ID assigned to the candidate patches, a number of the candidate patches nearest to any one of the local unknown patches based on the scores, and re-calculating the scores of the candidate patches based on the numbers for the subject ID assigned to the candidate patches.

<Supplementary Note 15>

The computer readable storage medium according to supplementary note 13 or 14, storing a program causing a computer to operate as:

image partitioning means for generating the input patches from the input images and the local unknown patches from the unknown images by partitioning allowing overlap; and image ID registration means for correlating an object input patch in the input patches with the subject ID assigned to the input image from which the object input patch is generated.

<Supplementary Note 16>

The computer readable storage medium according to supplementary note 15, storing a program causing a computer to operate as:

image synthesis means for normalizing the input images so that corresponding feature points are at same positions in the input images;

image reconstruction means for reconstructing the reconstruction image by using the selected patch; and the image partitioning means which partitions the normalized input images into the input patches so as to be allowed to overlap and partitions the unknown image into unknown patches so as to be allowed to overlap, the unknown patches being images in which the local unknown patches are included.

<Supplementary Note 17>

The computer readable storage medium according to supplementary note 15, storing a program causing a computer to operate as:

image synthesis means for normalizing the input images so that corresponding feature points are at same positions in the input images, and degrading the normalized input images;

the image partitioning means which partitions the normalized and degraded input images into the input patches so as to be allowed to overlap, generates a patch pair including each of the input patches and a reconstruction patch which is a part of the normalized input image so that the input patch included in each of the patch pairs corresponds to a degraded image of the reconstruction patch included in the patch pair, and partitions the unknown image into unknown patches so as to be allowed to overlap, the unknown patches being images in which the local unknown patches are included; and image reconstruction means for reconstructing the reconstruction image by using the reconstruction patch included in the patch pair including the selected patch.

<Supplementary Note 18>

The computer readable storage medium according to any one of supplementary notes 15 to 17, storing a program causing a computer to operate as:

input means for receiving the plurality of input images;

unknown image input means for receiving the unknown image;

image storage means for storing the plurality of input patches;

the image ID registration means which assigns the subject ID to each of the plurality of input images according the identity thereof; and the image partitioning means which stores the plurality of input patches in the image storage means, the subject ID of the input image from which the input patch is generated being correlated with the input patch for each of the plurality of input patches.

While the present invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The present invention can be used for reconstruction of high resolution images from surveillance camera images which are usually of low resolution and blurred. The present invention can also be used for face recognition with face images with occlusion, low resolution, etc. provided that the subject image is registered in the database.

REFERENCE SIGNS LIST 200 image processing device
200A image processing device
201 input unit
202 image synthesis unit
203 image ID registration unit
204 image partitioning unit
205 image storage unit
206 unknown image input unit
207 inferring unit
208 score calculation unit
209 patch replacement unit
210 image reconstruction unit
401 scores of patches
402 score
403 patch under consideration
404 surrounding area
500 image processing device
509 ID map construction unit
510 second score calculation unit
1000 computer
1001 processor
1002 memory
1003 storage device
1004 I/O interface
1005 storage medium

What is claimed is:

1. An image processing device comprising:
a memory that stores a set of instructions; and
at least one processor configured to execute the set of instructions to:
select, for each of local unknown patches, candidate patches from a plurality of input patches based on similarity to the local unknown patch, the local unknown patches being images generated from a part of an unknown image, the plurality of input patches being images generated from a plurality of input images, a subject ID (Identifier) being correlated with the input patches that are generated from an input image to which the subject ID is assigned in the plurality of input images;
calculate a score representing nearness of a candidate patch in the candidate patches to a local unknown patch in the local unknown patches; and
calculate a score summation for the subject ID by summing up scores of the candidate patches being correlated with a same subject ID in the candidate patches of the local unknown patches, and select for a target unknown patch in the local unknown patches, as a selected patch being used for reconstruction of a reconstruction image, a candidate patch that is correlated with the subject ID for which the score summation is highest from the candidate patches selected for the target unknown patch.

2. The image processing device according to claim 1, wherein
the at least one processor is configured to:
count, for the subject ID assigned to the candidate patches, a number of the candidate patches nearest to any one of the local unknown patches based on the scores, and re-calculate the scores of the candidate patches based on the numbers for the subject ID assigned to the candidate patches.

3. The image processing device according to claim 1, wherein
the at least one processor is configured to:
generate the input patches from the input images and the local unknown patches from unknown images by partitioning allowing overlap; and
correlate an object input patch in the input patches with the subject ID assigned to the input image from which the object input patch is generated.

4. The image processing device according to claim 3, wherein
the at least one processor is configured to:
normalize the input images so that corresponding feature points are at same positions in the input images;

reconstruct the reconstruction image by using the selected patch; and
partition the normalized input images into the input patches so as to be allowed to overlap and partition the unknown image into unknown patches so as to be allowed to overlap, the unknown patches being images in which the local unknown patches are included.

5. The image processing device according to claim 3, wherein the at least one processor is configured to:
normalize the input images so that corresponding feature points are at same positions in the input images, and degrade the normalized input images;
partition the normalized and degraded input images into the input patches so as to be allowed to overlap, generate a patch pair including one of the input patches and a reconstruction patch which is a part of the normalized input image so that the input patch included in each of the patch pairs corresponds to a degraded image of the reconstruction patch included in the patch pair, and partition the unknown image into unknown patches so as to be allowed to overlap, the unknown patches being images in which the local unknown patches are included; and
reconstruct the reconstruction image by using the reconstruction patch included in the patch pair including the candidate patch selected as the selected patch for the target unknown patch.

6. The image processing device according to claim 1, wherein
the at least one processor is configured to:
receive the plurality of input images;
receive the unknown image;
store the plurality of input patches in image storage;
assign the subject ID to each of the plurality of input images according the identity thereof; and
correlate the subject ID with each of the plurality of input patches according to the identity of the input image from which the each of the plurality of input patches is generated.

7. An image processing method comprising:
selecting, for each of local unknown patches, candidate patches from a plurality of input patches based on similarity to the local unknown patch, the local unknown patches being images generated from a part of an unknown image, the plurality of input patches being images generated from a plurality of input images, a subject ID (Identifier) being correlated with the input patches that are generated from an input image to which the subject ID is assigned in the plurality of input images;
calculating a score representing nearness of a candidate patch in the candidate patches to a local unknown patch in the local unknown patches; and
calculating a score summation for the subject ID by summing up scores of the candidate patches being correlated with a same subject ID in the candidate patches of the local unknown patches, and selecting for a target unknown patch in the local unknown patches, as a selected patch being used for reconstruction of a reconstruction image, a candidate patch that is correlated with the subject ID for which the score summation is highest from the candidate patches selected for the target unknown patch.

8. A non-transitory computer readable storage medium storing a program causing a computer to operate as:
inferring processing of selecting, for each of local unknown patches, candidate patches from a plurality of input patches based on similarity to the local unknown patch, the local unknown patches being images generated from a part of an unknown image, the plurality of input patches being images generated from a plurality of input images, a subject ID (Identifier) being correlated with the input patches that are generated from an input image to which the subject ID is assigned in the plurality of input images;
first score calculation processing of calculating a score representing nearness of a candidate patch in the candidate patches to a local unknown patch in the local unknown patches; and
patch replacement processing of calculating a score summation for the subject ID by summing up scores of the candidate patches being correlated with a same subject ID in the candidate patches of the local unknown patches, and selecting for a target unknown patch in the local unknown patches, as a selected patch being used for reconstruction of a reconstruction image, a candidate patch that is correlated with the subject ID for which the score summation is highest from the candidate patches selected for the target unknown patch.

9. The non-transitory computer readable storage medium according to claim 8, storing a program causing a computer to operate as:
second score calculation processing of counting, for the subject ID assigned to the candidate patches, a number of the candidate patches nearest to any one of the local unknown patches based on the scores, and re-calculating the scores of the candidate patches based on the numbers for the subject ID assigned to the candidate patches.

10. The non-transitory computer readable storage medium according to claim 8, storing a program causing a computer to operate as:
image partitioning processing of generating the input patches from the input images and the local unknown patches from unknown images by partitioning allowing overlap; and
image ID registration processing of correlating an object input patch in the input patches with the subject ID assigned to the input image from which the object input patch is generated.

* * * * *